(12) United States Patent
Nishida et al.

(10) Patent No.: US 8,245,682 B2
(45) Date of Patent: Aug. 21, 2012

(54) INLET VALVE, INTERNAL COMBUSTION ENGINE AND TRANSPORTATION APPARATUS INCLUDING THE SAME

(75) Inventors: Kenji Nishida, Shizuoka (JP); Shigeki Kawakita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 301 days.

(21) Appl. No.: 12/697,468

(22) Filed: Feb. 1, 2010

(65) Prior Publication Data
US 2011/0030642 A1    Feb. 10, 2011

(30) Foreign Application Priority Data

Aug. 7, 2009    (JP) .................. 2009-184870

(51) Int. Cl.
*F02N 3/00*    (2006.01)

(52) U.S. Cl. .................. 123/188.2; 123/188.4

(58) Field of Classification Search .............. 123/188.2, 123/188.3, 188.4, 188.16
See application file for complete search history.

(56) References Cited

FOREIGN PATENT DOCUMENTS

| EP | 0 024 890 A1 | 3/1981 |
|---|---|---|
| JP | 53-104021 A | 9/1978 |
| JP | 5-39706 A | 2/1993 |
| JP | 2008-88959 A | 4/2008 |

OTHER PUBLICATIONS

Official Communication issued in corresponding European Patent Application No. 10151784.5, mailed on Oct. 29, 2010.

*Primary Examiner* — Noah Kamen
(74) *Attorney, Agent, or Firm* — Keating & Bennett, LLP

(57) ABSTRACT

An inlet valve includes a valve head including a valve surface located at a circumferential edge portion, and a single annular circumferential edge groove disposed radially inside and close to the valve surface in the circumferential edge portion. When intake air (an airflow) proceeds along a surface of the valve head and reaches the circumferential edge portion, only a portion thereof (a partial airflow) enters the circumferential edge groove and the remaining thereof (remaining partial airflow) passes by the circumferential edge groove. As the intake air (the partial airflow) having entered the circumferential edge groove forms a turbulent flow, the intake air surrounds the circumferential edge portion of the valve head and reaches below the circumferential edge portion of the valve head, thereby achieving an increase in volume of air taken into a combustion chamber. Further, because only a portion of intake air enters the circumferential edge groove, it is possible to suppress and minimize flow resistance applied to air taken into the combustion chamber from an inlet port.

16 Claims, 11 Drawing Sheets

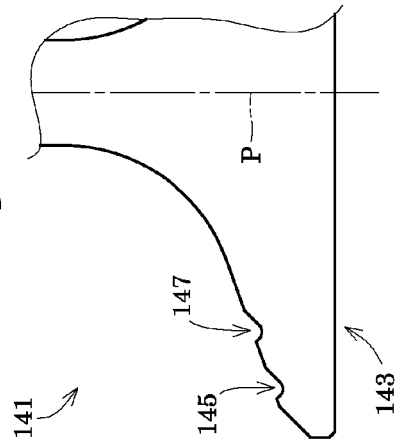
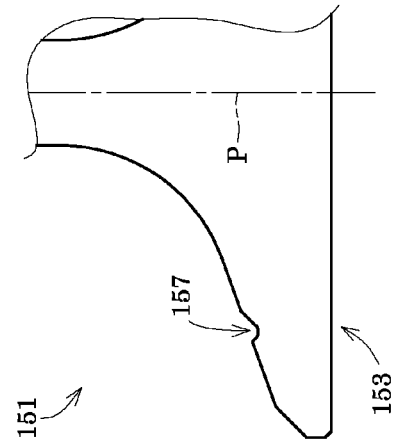
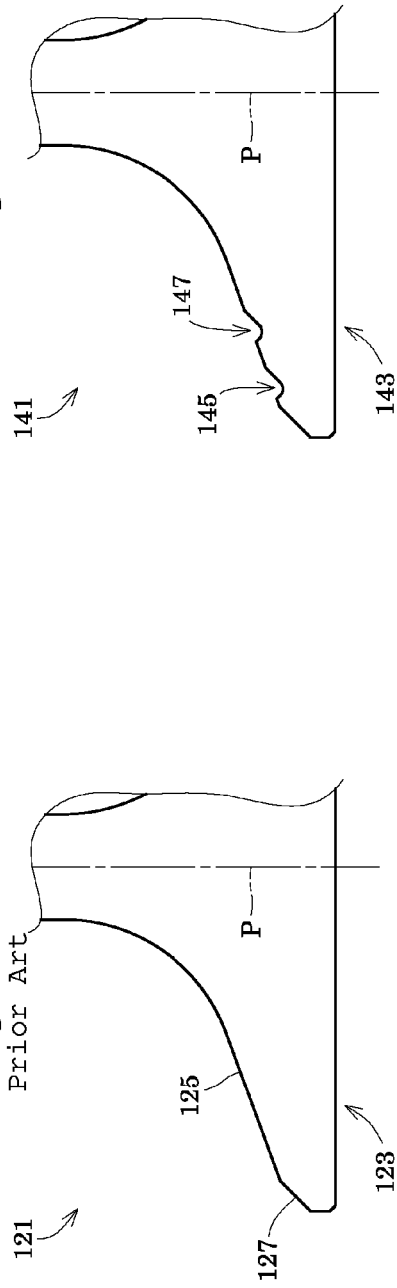
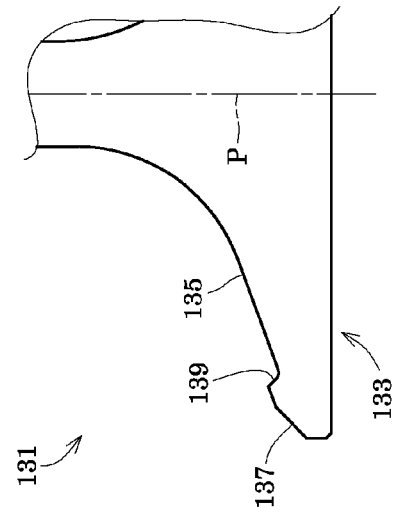

a : 92.7[MPa]    b : 59.0[MPa]

a : 92.6[MPa]    b : 56.1[MPa]
c : 167.5[MPa]

a : 92.7[MPa]    b : 48.4[MPa]

a : 117.2[MPa]   b : 63.6[MPa]

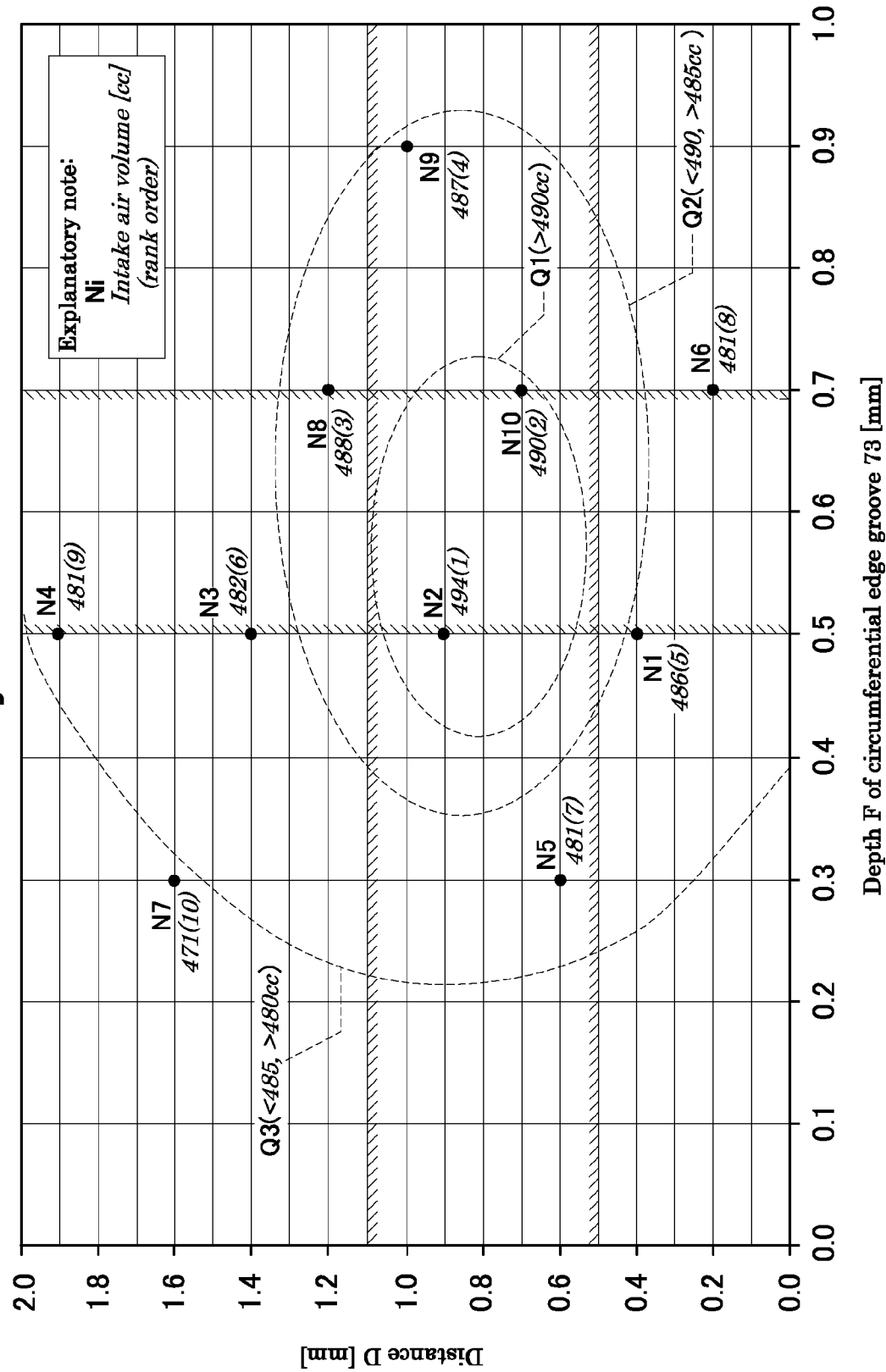

INLET VALVE, INTERNAL COMBUSTION ENGINE AND TRANSPORTATION APPARATUS INCLUDING THE SAME

BACKGROUND OF THE INVENTION

1. Field of the Invention

The present invention relates to an inlet valve, as well as an internal combustion engine and a transportation apparatus each including the inlet valve. In particular, the present invention relates to a technique that increases intake air volume.

2. Description of the Related Art

A conventional inlet valve is of a poppet type, and basically includes a valve stem and a valve head (as disclosed in Japanese Unexamined Patent Publications Nos. H05-39706 and 2008-88959, and the like).

The technique of Japanese Unexamined Patent Publication No. H05-39706 is intended to improve, in an inlet device that causes fuel to contact a valve head of an inlet valve so as to combust the fuel, combustion in a combustion chamber by making the fuel concentration distribution uniform. There is disclosed in Japanese Unexamined Patent Publication No. H05-39706, an inlet valve including a valve head provided on a rear surface with a plurality of grooves in substantially concentric circular shapes. A fuel injection valve provided in an inlet pipe sprays a fuel toward the rear surface of the valve head of the inlet valve. Air mixed with the fuel is guided along the plurality of grooves so as to spread into an entire circumferential area on the rear surface of the valve head, and is then taken into a combustion chamber. Since the fuel is uniformly dispersed (that is, no portion of high or low fuel distribution occurs) as described above, it is possible to improve combustion.

The technique of Japanese Unexamined Patent Publication No. 2008-88959 is intended to improve a packing efficiency of an internal combustion engine in the intake stroke by causing air (inclusive of an air-fuel mixture as well as air alone mixed with no fuel) to smoothly flow from an inlet port into a combustion chamber. There is disclosed in Japanese Unexamined Patent Publication No. 2008-88959, an inlet valve provided with a stepped part (barrier) between a valve surface and an inclined surface that is formed in a substantially conical shape from a tip to a circumferential edge portion of a valve head so as to be stepped downward from the valve surface. This inlet valve causes intake air flowing along the inclined surface of the inlet valve to hit the stepped portion so as to form eddies around the stepped portion. Thus, intake air flows smoothly on the surface of the valve head. As a result, air can be smoothly taken into a combustion chamber from an inlet port.

The inlet valve described in Japanese Unexamined Patent Publication No. H05-39706 is not intended to increase an intake air volume. On the other hand, the inlet valve described in Japanese Unexamined Patent Publication No. 2008-88959 is intended to increase an intake air volume. However, more dynamic power will be generated with an intake air volume that is further increased relative to the intake air volume of the inlet valve described in Japanese Unexamined Patent Publication No. 2008-88959.

SUMMARY OF THE INVENTION

Preferred embodiments of the present invention provide an inlet valve that increases an intake air volume, as well as, an internal combustion engine and a transportation apparatus each including the inlet valve.

According to a preferred embodiment of the present invention, an inlet valve provided in an inlet port communicated with a combustion chamber includes a valve head including a valve surface at a circumferential edge portion of the valve head, and a single annular circumferential edge groove disposed radially inside and close to the valve surface in the circumferential edge portion, and a valve stem including a first end coupled with a tip of the valve head and a second end extending upward.

According to a preferred embodiment of the present invention relating to the above inlet valve, intake air flows along the surface of the valve head from the tip to the circumferential edge portion. In this specification, "intake air" indicates "air taken into the combustion chamber from the inlet port." Herein, "air" includes air-fuel mixture having air and a fuel mixed therein as well as air alone mixed with no fuel. When intake air proceeds along the surface of the valve head and reaches the circumferential edge portion, only a portion thereof enters the circumferential edge groove and the remaining thereof passes by above the circumferential edge groove. The intake air having entered the circumferential edge groove generates quite small eddies (in other words, an irregularly winding flow) to form a slight turbulent flow. The intake air having formed the turbulent flow reaches the adjacent valve surface while remaining as the turbulent flow.

As described above, the turbulent flow is formed by a portion of the intake air flowing along the surface of the circumferential edge portion of the valve head, so that intake air is prevented from not flowing along the circumferential edge portion of the valve head (in other words, separation of the flow of intake air from the surface of the circumferential edge portion of the valve head is prevented). As a result, intake air is likely to surround the circumferential edge portion of the valve head to reach below the circumferential edge portion of the valve head. Therefore, the flow path of intake air into the combustion chamber through the inlet valve is increased, and thus air can be efficiently taken into the combustion chamber from the inlet port. Accordingly, the intake air volume entering the combustion chamber is significantly increased.

Because only a portion of intake air flowing along the surface of the valve head enters the circumferential edge groove, the remaining intake air flowing along the surface of the valve head does not receive flow resistance by the circumferential edge groove. It is thus possible to prevent and minimize flow resistance applied to intake air. Moreover, as the circumferential edge groove is disposed radially inside and close to the valve surface, it is possible to supply the circumferential edge portion of the valve head with the turbulent flow of intake air even with the slight turbulent flow being generated. Therefore, it is also possible to reduce flow resistance applied to intake air entering the circumferential edge groove.

In a preferred embodiment of the present invention, the valve surface and the circumferential edge groove are spaced apart from each other in plan view preferably by a distance of at least about 0.5 mm and at most about 1.1 mm, for example. The circumferential edge groove provided in the circumferential edge portion of the valve head contributes to an increase in intake air volume.

In a preferred embodiment of the present invention, the circumferential edge groove preferably has a width in plan view that is substantially equal to or less than a width of the valve surface. It is thus possible to prevent and minimize the flow resistance applied to intake air by providing the circumferential edge groove having such a relatively small width in the circumferential edge portion of the valve head.

In a preferred embodiment of the present invention, preferably, the valve head further includes a central surface smoothly inclined radially outward and downward from the tip to the circumferential edge groove, and the circumferential edge groove is concave downward from the central surface. The smooth central surface allows intake air to flow smoothly along the central surface. Further, as the circumferential edge groove is concave from the central surface, only a portion of the intake air flowing along the central surface is appropriately caused to enter the circumferential edge groove.

In a preferred embodiment of the present invention, the circumferential edge groove preferably has a depth of at least about 0.5 mm and at most about 0.7 mm, for example. Such a depth produces generation of an appropriate turbulent flow as well as suppression of the flow resistance applied to the intake air flowing into the circumferential edge groove.

In a preferred embodiment of the present invention, the circumferential edge groove preferably has a cross section in a substantially V-letter shape.

In a preferred embodiment of the present invention, the circumferential edge portion of the valve head preferably does not protrude upward from an extended line of the central surface. Such a configuration enables smooth flow of intake air passing by above the circumferential edge groove.

In a preferred embodiment of the present invention, preferably, the circumferential edge groove includes an inner interior wall joined with the central surface, and the inner interior wall is inclined radially outward and downward from the central surface at an angle of at least about 15 degrees and at most about 30 degrees, for example. With the above arrangement, the intake air entering the circumferential edge groove can be gradually redirected. Accordingly, the flow resistance applied to the intake air is prevented and minimized.

In a preferred embodiment of the present invention, the inner interior wall is joined with the central surface at an inner joint portion preferably having a radius of curvature of at most about 0.3 mm, for example. Intake air passing by the inner joint portion having a radius of curvature of at most about 0.3 mm is likely to form a turbulent flow. As the intake air that is likely to form a turbulent flow enters the circumferential edge groove, the intake air can effectively form a turbulent flow in the circumferential edge groove.

In a preferred embodiment of the present invention, preferably, the valve head includes an annular circumferential edge surface between the circumferential edge groove and the valve surface, the circumferential edge groove includes an outer interior wall joined with the circumferential edge surface, and the outer interior wall is inclined radially inward and downward from the circumferential edge surface at an angle of at least about 60 degrees and at most about 75 degrees, for example. In the above configuration, the intake air flowing into the circumferential edge groove is desirably caused to hit the outer interior wall. It is thus possible to preferably generate a turbulent flow in the circumferential edge groove.

In a preferred embodiment of the present invention, the outer interior wall is joined with the circumferential edge surface at an outer joint portion preferably having a radius of curvature of at most about 0.3 mm, for example. Intake air passing by the outer joint portion having a radius of curvature of at most about 0.3 mm is likely to remain as the turbulent flow. Therefore, the intake air having formed the turbulent flow in the circumferential edge groove can reach the valve surface while remaining as the turbulent flow.

In a preferred embodiment of the present invention, the outer joint portion is preferably located on an extended line of the central surface. The above configuration allows the intake air having passed by above the circumferential edge groove to smoothly flow without hitting the outer joint portion.

In a preferred embodiment of the present invention, the valve head is preferably made of titanium or a titanium alloy, for example. Such an arrangement allows the valve head to be highly strong and light.

According to another preferred embodiment of the present invention, an engine unit includes an inlet valve provided in an inlet port communicated with a combustion chamber, a cylinder head provided with the inlet port, a cylinder block coupled with a bottom of the cylinder head, and a piston arranged in the cylinder block so as to be reciprocable therein, and defining the combustion chamber, which is communicated with the inlet port, together with the cylinder head and the cylinder block, wherein the inlet valve includes a valve head and a valve stem including a first end coupled with a tip of the valve head and a second end extending upward, and the valve head includes a valve surface at a circumferential edge portion of the valve head, and a single annular circumferential edge groove disposed radially inside and close to the valve surface in the circumferential edge portion.

According to a preferred embodiment of the present invention relating to the above engine unit, the circumferential edge groove provided in the inlet valve allows air to be taken into the combustion chamber from the inlet port. As a result, an intake air volume entering the combustion chamber is significantly increased, and the engine unit is therefore capable of generating more dynamic power.

Furthermore, another preferred embodiment of the present invention provides a transportation apparatus including an engine unit that includes an inlet valve provided in an inlet port communicated with a combustion chamber, a cylinder head provided with the inlet port, a cylinder block coupled with a bottom of the cylinder head, and a piston arranged in the cylinder block so as to be reciprocable therein, and defining the combustion chamber, which is communicated with the inlet port, together with the cylinder head and the cylinder block, wherein the inlet valve includes a valve head and a valve stem including a first end coupled with a tip of the valve head and a second end extending upward, and the valve head includes a valve surface at a circumferential edge portion of the valve head, and a single annular circumferential edge groove disposed radially inside and close to the valve surface in the circumferential edge portion.

According to a preferred embodiment of the present invention relating to the above transportation apparatus, the engine unit generates more dynamic power and therefore allows the transportation apparatus to have significantly improved performance.

In various preferred embodiments of the present invention, the portion of the valve head located radially outside the inner joint portion where the central surface and the circumferential edge groove are joined with each other does not protrude upward from the extended line of the central surface.

Thus, intake air having flowing along the central surface is also allowed to smoothly flow along the circumferential edge portion.

In various preferred embodiments of the present invention, the extended line of the central surface is identical with a tangent line of the central surface at the inner joint portion where the central surface and the circumferential edge groove is joined with each other in sectional view.

Thus, the flow of intake air along the central surface is not impeded or affected.

In various preferred embodiments of the present invention, the inner joint portion, where the inner interior wall and the central surface are joined with each other, includes an edge that is not rounded off.

As a result, intake air that has passed by the inner joint portion including such an edge that is not rounded off is likely to form a turbulent flow. As intake air that is likely to form a turbulent flow enters the circumferential edge groove, the intake air can effectively form a turbulent flow in the circumferential edge groove.

In various preferred embodiments of the present invention, the inner joint portion has a radius of curvature of at most about 0.1 mm, for example.

Accordingly, intake air passing by the inner joint portion is allowed to more effectively form a turbulent flow.

In various preferred embodiments of the present invention, the inner joint portion where the inner interior wall and the central surface are joined with each other includes a sharp edge.

Thus, intake air that has passed by the inner joint portion including such a sharp edge is likely to form a turbulent flow. As intake air that is likely to form a turbulent flow enters the circumferential edge groove, the intake air can effectively form a turbulent flow in the circumferential edge groove.

In various preferred embodiments of the present invention, the outer interior wall and the inner interior wall form an angle of substantially 90 degrees in sectional view, for example.

Therefore, intake air having flown into the circumferential edge groove is allowed to hit the outer interior wall at a substantially right angle.

In various preferred embodiments of the present invention, a lower portion of the outer interior wall is smoothly and continuously connected with a lower portion of the inner interior wall.

As a result, intake air having hit the interior portion of the circumferential edge groove is allowed to smoothly flow out of the circumferential edge groove.

In various preferred embodiments of the present invention, the outer joint portion where the outer interior wall and the circumferential edge surface are joined with each other includes an edge that is not rounded off.

In various preferred embodiments of the present invention, intake air that has passed the outer joint portion including an edge that is not rounded off is likely to remain as the turbulent flow. Therefore, the intake air having formed the turbulent flow in the circumferential edge groove can reach the valve surface while remaining as the turbulent flow.

In various preferred embodiments of the present invention, the outer joint portion has a radius of curvature of at most about 0.1 mm.

As a result, intake air having passed by the outer joint portion is likely to remain as the turbulent flow more effectively.

In various preferred embodiments of the present invention, the outer joint portion where the outer interior wall and the circumferential edge surface are joined with each other includes a sharp edge.

Thus, intake air that has passed the outer joint portion including such a sharp edge is likely to remain as the turbulent flow. Therefore, the intake air having formed the turbulent flow in the circumferential edge groove can reach the valve surface while remaining as the turbulent flow.

In various preferred embodiments of the present invention, the tangent line of the central surface at the inner joint portion is inclined from an axis of the valve stem at an angle of at least about 60 degrees and at most about 75 degrees, for example.

Accordingly, the valve head can be formed in a relatively flat shape (in other words, a shape with a suppressed longitudinal height of the valve head). Therefore, the thickness of the valve head can be reduced to achieve reduction in weight of the inlet valve.

In various preferred embodiments of the present invention, the valve stem is preferably made of titanium or a titanium alloy, for example.

Therefore, it is possible to realize the valve stem highly strong and light.

In various preferred embodiments of the present invention, the valve surface and the circumferential edge groove are provided on and in the upper surface of the valve head directed to the inlet port.

In various preferred embodiments of the present invention, the depth of the circumferential edge groove is based on the tangent line of the central surface at the inner joint portion where the central surface and the circumferential edge groove are joined with each other in sectional view.

Other elements, features, steps, characteristics and advantages of the present invention will become more apparent from the following detailed description of the preferred embodiments with reference to the attached drawings.

BRIEF DESCRIPTION OF THE DRAWINGS

For the purpose of illustrating the invention, there are shown in the drawings several embodiments which are presently preferred, it being understood, however, that the present invention is not limited to the precise arrangement and instrumentalities shown.

FIG. 8A is a view showing a shape of an inlet valve according to a comparative example.

FIG. 8B is a view showing a shape of an inlet valve according to a comparative example.

FIG. 8C is a view showing a shape of an inlet valve according to a comparative example.

FIG. 8D is a view showing a shape of an inlet valve according to a comparative example.

FIG. 12 is a pattern diagram indicating a relationship between intake air volumes and combinations of a distance and a depth of a circumferential edge groove of the inlet valve according to a preferred embodiment of the present invention.

DETAILED DESCRIPTION OF THE PREFERRED EMBODIMENTS

Preferred embodiments of the present invention are described in detail below with reference to the drawings.

The following description exemplifies a two-wheeled motor vehicle as a transportation apparatus according to various preferred embodiments of the present invention.

Figure 1:
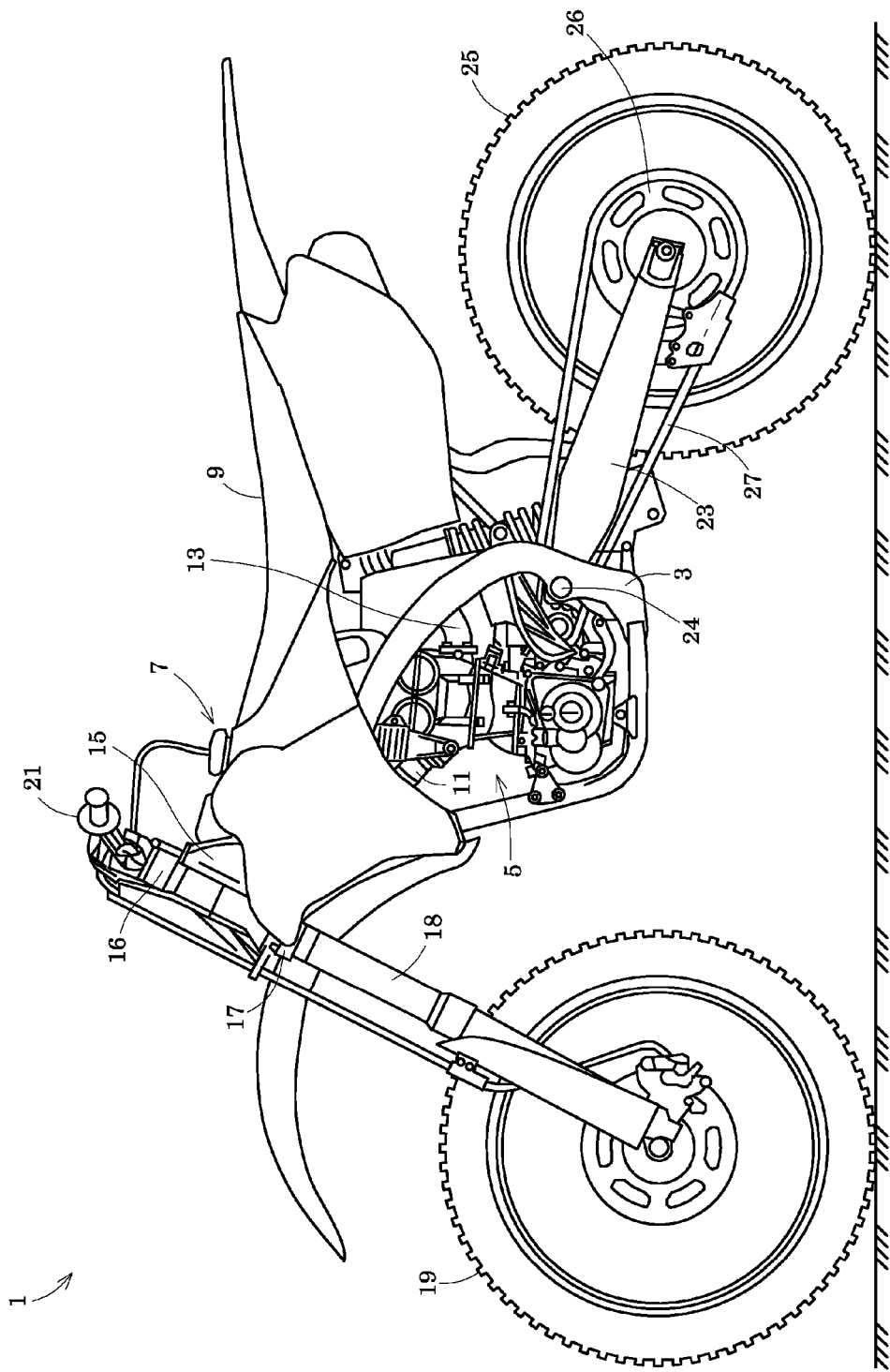
FIG. 1 is a side view of a general configuration of a two-wheeled motor vehicle according to a preferred embodiment of the present invention.

FIG. 1 is a side view of a general configuration of the two-wheeled motor vehicle (hereinafter, referred to as a motorbike) according to the present preferred embodiment. A motorbike 1 shown therein preferably is of a type focused on travel performance on irregular grounds, for example. In FIG. 1, a front portion of the motorbike 1 is located on the left side of the drawing.

The motorbike 1 includes a main frame 3. Fixed to the main frame 3 are an engine unit 5, a fuel tank 7, a seat 9, and the like. The engine unit 5 is disposed in a lower portion of the main frame 3. The engine unit 5 is connected with an inlet pipe 11 and an exhaust pipe 13. The fuel tank 7 is disposed on top of the main frame 3 close to a front end thereof. The seat 9 is disposed on top of the main frame 3 close to a rear end thereof.

A head pipe 15 is fixedly coupled with an upper front end of the main frame 3. A steering shaft (not shown) is supported by the head pipe 15 so as to be rotatable about an axis thereof. The steering shaft is connected with a front fork 18 via a handle crown 16 and an under bracket 17. A front wheel 19 is rotatably supported by a lower end of the front fork 18. The steering shaft is also connected with a handle 21 via the handle crown 16.

A swing arm 23 is connected with a lower rear end of the main frame 3 so as to be swingable about a pivot shaft 24. The swing arm 23 extends rearward from the main frame 3, and a rear end thereof rotatably supports a rear wheel 25. The rear wheel 25 is coupled with a driven sprocket 26 so as to be integrally rotatable. The driven sprocket 26 has a chain 27 wound therearound. The chain 27 is also wound around a drive sprocket (not shown). Dynamic power generated by the engine unit 5 is transmitted to the rear wheel 25 by way of the drive sprocket, the chain 27, and the driven sprocket 26. The motorbike 1 is then caused to travel forward.

Figure 2:
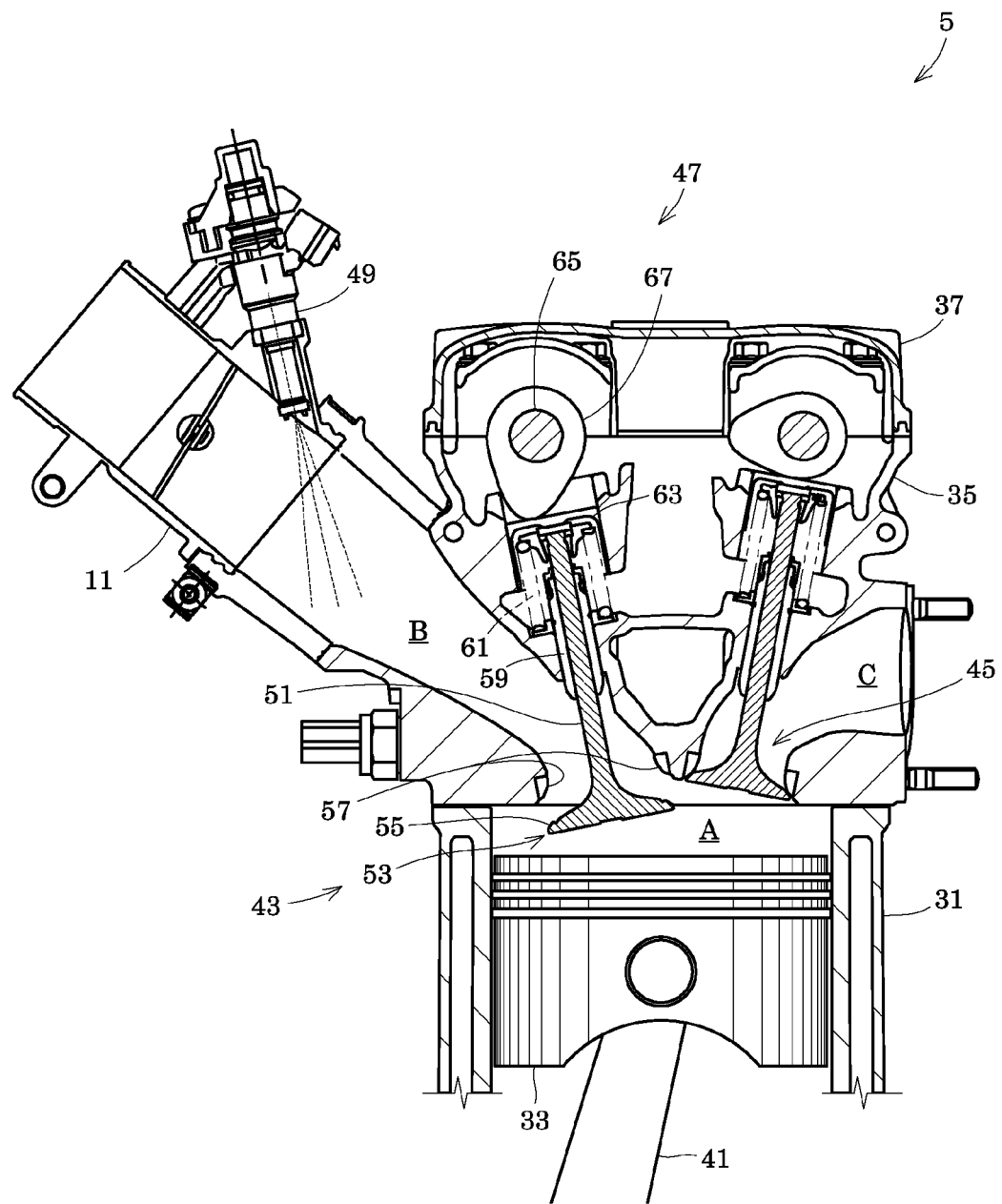
FIG. 2 is a cross sectional view of a main portion of an engine unit.

FIG. 2 is a cross sectional view of a main portion of the engine unit 5. The engine unit 5 includes a cylinder block 31, a piston 33, a cylinder head 35, a head cover 37, and the like.

The piston 33 is arranged in the cylinder block 31 so as to be reciprocable. A con rod 41 is interlocked with a lower portion of the piston 33. An upper surface of the cylinder block 31 is coupled with a bottom of the cylinder head 35. A combustion chamber A is configured by the cylinder block 31, the cylinder head 35, and the piston 33.

There are formed in the cylinder head 35 an inlet port B and an exhaust port C each communicated with the combustion chamber A. The cylinder head 35 is also provided with an inlet valve 43 arranged to open/close the inlet port B, and an exhaust valve 45 arranged to open/close the exhaust port C. Provided in an upper portion of the cylinder head 35 is a valve drive mechanism 47 arranged to drive the inlet valve 43 and the exhaust valve 45.

The inlet port B has a first end opened to a bottom surface (combustion chamber A) of the cylinder head 35. The inlet port B has a second end opened to a side portion of the cylinder head 35 and is connected and communicated with the inlet pipe 11 described above. The inlet pipe 11 is provided with a fuel injection unit 49 arranged to spray a fuel toward the inlet port B. When the inlet pipe 11 supplies air and the fuel injection unit 49 sprays the fuel, there is generated an air-fuel mixture which includes air and the fuel mixed with each other and is to be supplied to the inlet port B. Hereinafter, the term "air" is used to collectively indicate an air-fuel mixture which includes air and the fuel mixed with each other as well as air alone mixed with no fuel. In particular, air taken into the combustion chamber A from the inlet port B is referred to as "intake air" where appropriate.

The inlet valve 43 is preferably of a poppet type, and has a bar-shaped valve stem 51 and valve head 53. The valve stem 51 has one end coupled integrally with a tip of the valve head 53. The valve head 53 has an annular valve surface 55. The inlet port B (more particularly an edge of the inlet port B opened to the combustion chamber A) is provided with a valve seat 57 arranged to come in contact with the valve surface 55. When the valve surface 55 shifts so as to be spaced away from the valve seat 57, air flows between the valve surface 55 and the valve seat 57 so as to be taken into the combustion chamber A from the inlet port B.

The valve stem 51 is inserted to pass through a tubular valve guide 59 so as to be slidable. Attached to the valve stem 51 is a valve spring 61 that biases the inlet valve 43 into a closing direction (upward). A stem end 63 is attached to an upper end of the valve stem 51.

The valve drive mechanism 47 includes a cam shaft 65 and a cam 67 rotating integrally with the camshaft 65. The cam 67 comes in contact with the stem end 63. The cam 67 rotates to push the inlet valve 43 downward so that the inlet valve 43 shifts in an opening direction (downward).

The exhaust valve 45 is configured similarly to the inlet valve 43, and exhausts combustion gas from the combustion chamber A to the exhaust port C.

Figure 3:
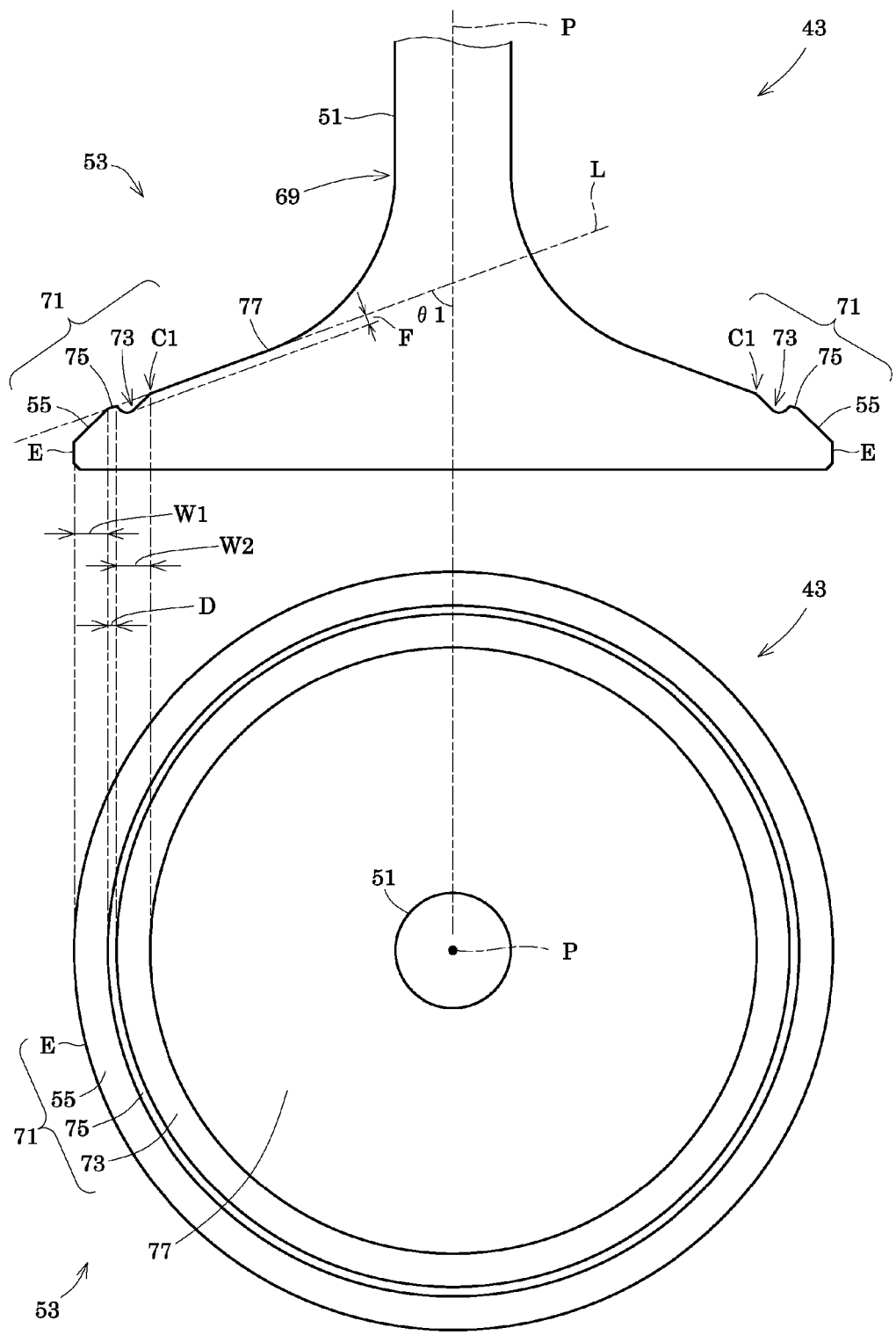
FIG. 3 includes a cross sectional view and a plan view of an inlet valve.

FIG. 3 includes a cross sectional view (upper half) and a plan view (lower half) of the inlet valve 43. The following description on the inlet valve 43 assumes that the valve stem 51 has an axis P in a longitudinal direction, such that the inlet valve includes the "upper" valve stem 51 and the "lower" valve head. As shown in FIG. 3, the valve stem 51 has a lower end coupled integrally with a tip 69 of the valve head 53. Although not shown, the valve stem 51 extends upward from the valve head 53.

The valve head 53 is provided in a circumferential edge portion 71 thereof with the valve surface 55 described above and a circumferential edge groove 73. In this specification, unless particularly noted, the circumferential edge portion 71 of the valve head 53 refers to a circumferential edge portion on an upper surface of the valve head 53 directed to the inlet port B.

The valve surface 55 preferably has a circular ring shape centered about the axis P of the valve stem 51 in plan view. The circumferential edge groove 73 preferably includes a single groove, and has a circular ring shape of a diameter slightly smaller than that of the valve surface 55 centered about the axis P in plan view. The circumferential edge groove 73 is located radially inside and close to the valve surface 55.

There is formed a circumferential edge surface 75 between the valve surface 55 and the circumferential edge groove 73. The circumferential edge surface 75 is not in contact with the valve seat 57. According to the present preferred embodiment, the circumferential edge portion 71 of the valve head 53 is inclusive of the circumferential edge groove 73, the circumferential edge surface 75, and the valve surface 55.

A distance D in plan view between the valve surface 55 and the circumferential edge groove 73 (that is, a width of the circumferential edge surface 75 in plan view) is much smaller than a width W1 of the valve surface 55 in plan view. Specifically, the distance D is preferably at least about 0.5 mm and at most about 1.1 mm, for example. Thus, the circumferential edge groove 73 is disposed quite close to the valve surface 55. Preferably, a width W2 of the circumferential edge groove 73 in plan view is substantially equal to or less than the width W1 of the valve surface 55 in plan view.

There is formed a central surface 77 radially inside the circumferential edge portion 71 (circumferential edge groove 73) of the valve head 53. The central surface 77 is smoothly inclined downward and outward in the radial direction around the axis P (hereinafter, simply referred to as "radially") from the tip 69 to the circumferential edge groove 73 of the valve head 53. In other words, the central surface 77 is not provided with a groove-shaped concave portion or a raised convex portion.

The circumferential edge groove 73 described above is concave downward from the central surface 77. The circumferential edge groove 73 has a depth F of preferably at least about 0.5 mm and at most about 0.7 mm, for example. The depth F of the circumferential edge groove 73 is defined as a distance in sectional view from a tangent line L of the central surface 77 at an inner joint portion C1 where the central surface 77 and the circumferential edge groove 73 are joined with each other. In this specification, the inner joint portion C1 is located at a radially outer end of the central surface 77, so that the tangent line L is referred to as "the extended line L of the central surface 77" where appropriate.

The tangent line L and the axis P of the valve stem 51 define an angle θ1, which is preferably at least about 60 degrees and at most about 75 degrees, for example. In this configuration, the valve head 53 can have a relatively flat shape (in other words, a shape with a suppressed longitudinal height of the valve head 53). Therefore, the thickness of the valve head 53 can be reduced to achieve reduction in weight of the inlet valve 43.

Figure 4:
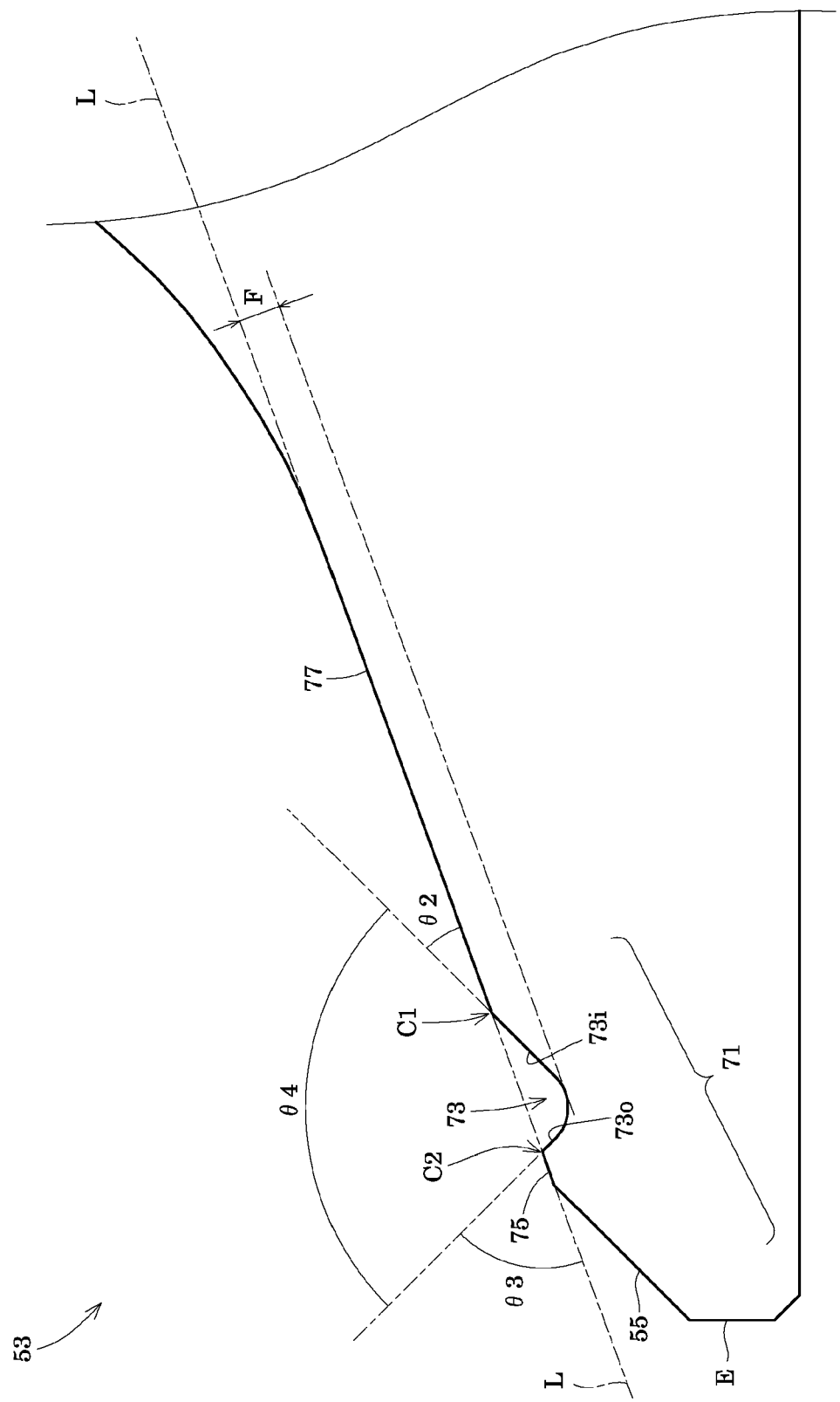
FIG. 4 is a cross sectional view of a main portion of a valve head.

Now refer to FIG. 4 showing a cross sectional view of a main portion of the valve head 53. As shown in FIG. 4, the circumferential edge surface 75 is located on the tangent line L while the valve surface 55 and the circumferential edge groove 73 are located below the tangent line L. That is, the circumferential edge portion 71 (more specifically, a region radially outside the inner joint portion C1) does not protrude upward from the extended line L of the central surface 77.

The circumferential edge groove 73 has a substantially V-letter shape in sectional view. The circumferential edge groove 73 has an inner interior wall 73i located radially inside and an outer interior wall 73o located radially outside. The inner interior wall 73i is inclined radially outward and downward from the central surface 77 at an angle θ2, which is preferably at least about 15 degrees and at most about 30 degrees, for example. The angle θ2 corresponds to an angle formed by the tangent line L of the central surface 77 and the inner interior wall 73i in sectional view.

The outer interior wall 73o is inclined radially inward and downward from the circumferential edge surface 75 at an angle θ3, which is preferably at least about 60 degrees and at most about 75 degrees, for example. The angle θ3 corresponds to an angle formed by the circumferential edge surface 75 and the outer interior wall 73o in sectional view.

The inner interior wall 73i and the outer interior wall 73o form an angle θ4 in sectional view, which is preferably substantially 90 degrees, for example.

The inner interior wall 73i is joined with the central surface 77 at the inner joint portion C1 described above. The inner joint portion C1 preferably has a sharp edge (edge not rounded off). It is thus preferred that the inner joint portion C1 is not chamfered. More specifically, the inner joint portion C1 preferably has a radius of curvature of at most about 0.3 mm, for example. The radius of curvature at the inner joint portion C1 is more preferably at most about 0.1 mm, for example.

The outer interior wall 73o is joined with the circumferential edge surface 75 at an outer joint portion C2 described above. The outer joint portion C2 also preferably has a sharp edge. It is thus preferred that the outer joint portion C2 is not chamfered. More specifically, the outer joint portion C2 preferably has a radius of curvature of at most about 0.3 mm, for example. The radius of curvature at the outer joint portion C2 is more preferably at most about 0.1 mm, for example. The outer joint portion C2 is located on the extended line L of the central surface 77.

A lower portion of the inner interior wall 73i and a lower portion of the outer interior wall 73o are joined with each other so as to define a smooth curved surface. The valve head 53 of the inlet valve 43 described above is designed to have a diameter appropriately selected. As one example, the diameter of a circumferential edge end E of the valve head 53 is preferably from about 22.2 mm to about 36 mm, for example.

The inlet valve 43 described above may be made of a material such as a titanium alloy or pure titanium, for example. Examples of titanium alloys include Ti-3Al-2V, Ti-6Al-4V, Ti-6Al-4Sn-4Zr-0.8Nb-0.9Mo-0.2Si-5TiB, and Ti-6Al-2Sn-4Zr-2Mo. In the case where the inlet valve 43 is made of a titanium alloy or pure titanium, the inlet valve 43 is preferably coated with an oxide layer in an oxidation furnace in the process of manufacture thereof. The inlet valve 43 is provided on the surface thereof with an oxide layer ($TiO_2$ layer) by such treatment, resulting in increases in rigidity and abrasion resistance. Further, shot peening treatment of spraying shots (steel particles) to the inlet valve 43 at a high speed is preferably applied in the process of manufacture of the inlet valve 43. The inlet valve 43 thus treated has improved fatigue strength.

Figure 5:
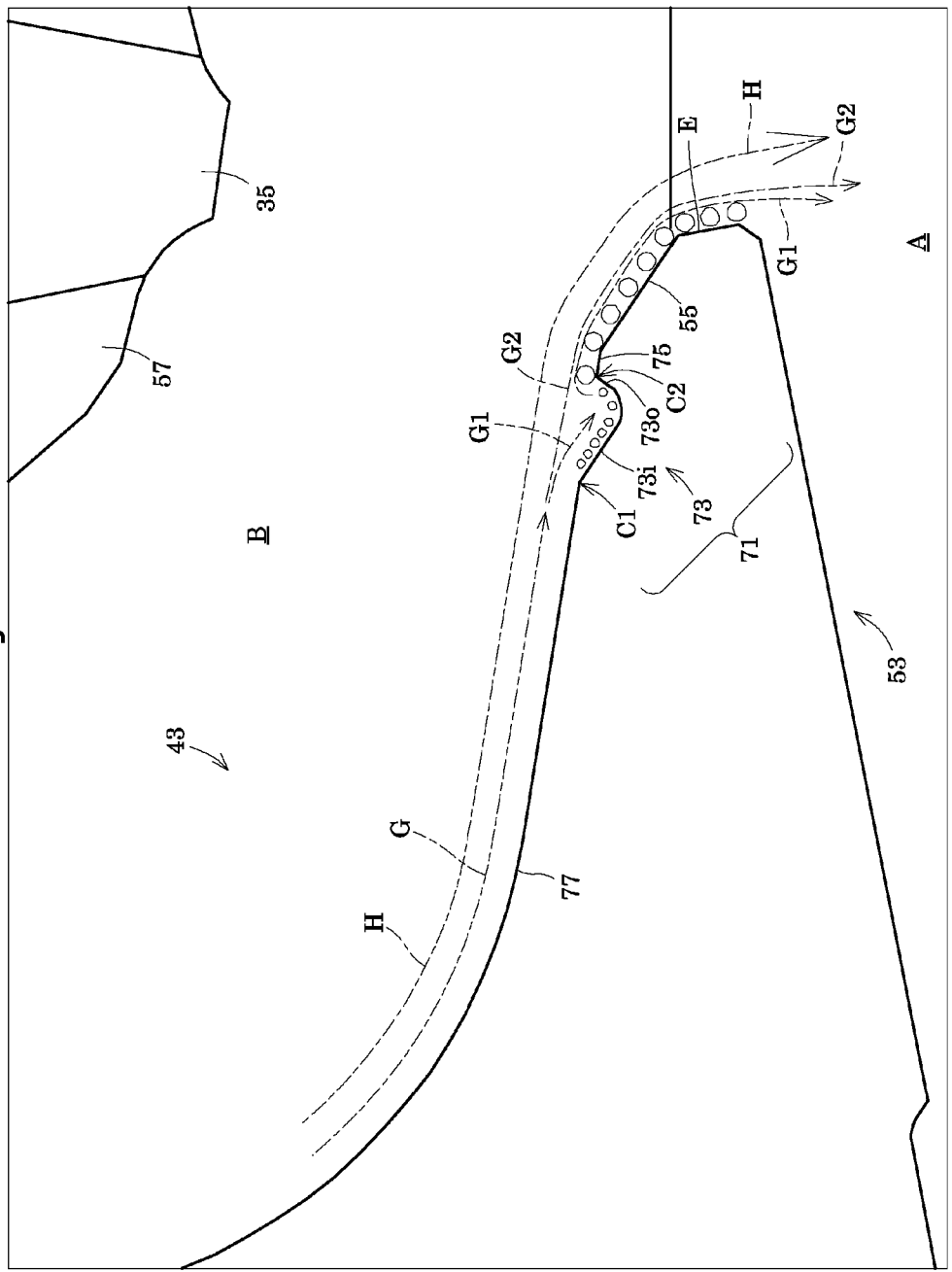
FIG. 5 is a pattern diagram showing movement of intake air.

Described next are behaviors of the motorbike 1 according to the present preferred embodiment by focusing mainly on how air is taken into the combustion chamber A by the inlet valve 43. FIG. 5 is a pattern diagram showing a flow of air (air-fuel mixture in the present preferred embodiment) taken into the combustion chamber A. Shown in FIG. 5 are patterns of a flow G of air proceeding near the central surface 77 as well as a flow H of air proceeding in an area slightly away from the central surface 77 relative to the airflow G.

As shown in FIG. 5, intake air flows radially outward along the central surface 77. As the central surface 77 is smoothly inclined, the airflow G forms a laminar flow along the central surface 77.

Upon reaching the inner joint portion C1, the airflow G is divided into airflows G1 and G2 proceeding in different directions. The airflow G1 as part of the airflow G is redirected gradually in the vicinity of the inner joint portion C1 to enter the circumferential edge groove 73. The remaining airflow G2 as part of the airflow G passes by the inner joint portion C1 with no redirection and proceeds to follow the extended line L of the central surface 77. The airflow G2 thus passes above the circumferential edge groove 73.

After having passed by the inner joint portion C1, the airflow G1 forms an extremely weak turbulent flow, or barely remains as the laminar flow while becoming almost a turbulent flow. This specification describes such a state "as being likely to form a turbulent flow." The airflow G1 is likely to form a turbulent flow in the vicinity of the inner interior wall 73i. Such a situation is shown in FIG. 5 as patterns with use of relatively small circles (○).

The airflow G1 proceeds along the inner interior wall 73i to hit the outer interior wall 73o. The airflow G1 is incident on the outer interior wall 73o at a substantially right angle. After hitting, the airflow G1 comes out of the circumferential edge groove 73 and preferably forms a turbulent flow. Further, the airflow G1 passes by the outer joint portion C2 upon coming out of the circumferential edge groove 73, so that the airflow G1 is likely to remain as the turbulent flow. However, the circumferential edge groove 73 merely causes a quite weak turbulent flow. FIG. 5 shows the area of the preferable turbulent flow as patterns with use of relatively large circles (o).

After coming out of the circumferential edge groove 73, the airflow G1 proceeds along the circumferential edge surface 75 and the valve surface 55 together with the airflow G2 that has passed by above the circumferential edge groove 73. On this occasion, the airflow G2 does not hit the outer joint portion C2.

A turbulent flow is more likely to proceed along a surface of an object relative to a laminar flow (in other words, a turbulent flow has a nature of tending not to be separated from a surface of an object in comparison to a laminar flow). Accordingly, the airflow G1 proceeds to preferably follow the shapes of the surfaces of the circumferential edge surface 75 and the valve surface 55. Even upon reaching the circumferential edge end E, the airflow G1 tends to proceed along the circumferential edge end E. As a result, the airflow G1 is redirected from radially outward into downward so as to surround the circumferential edge portion 71 of the valve head 53. Thereafter, the airflow G1 departs from the valve head 53 and enters the combustion chamber A. The airflows G2 and H proceed outside the path of the airflow G1 and enter the combustion chamber A.

As described above, the flow path of intake air into the combustion chamber A through the inlet valve 43 (that is, the path of air flowing into the combustion chamber A) is spread not only radially outward (in other words, to an area lateral to the circumferential edge portion 71 of the valve head 53 or along the extended line L of the central surface 77) but also to an area below the circumferential edge portion 71 of the valve head 53. As the flow path of intake air into the combustion chamber A through the inlet valve 43 is thus widely spread, air is efficiently taken into the combustion chamber A. As a result, the volume of air taken into the combustion chamber A, that is, the intake air volume, is increased.

Since only part (the airflow G1) of intake air flowing along the surface of the valve head 53 enters the circumferential edge groove 73, the remaining intake air (the airflow G2) is allowed to proceed with no flow resistance being applied thereto. As described above, since air taken into the combustion chamber A from the inlet port B receives relatively low resistance, such air can be efficiently taken into the combustion chamber A. Suppressed flow resistance realizes stable intake efficiency. For example, intake efficiency of the inlet valve 43 is well maintained even upon variation in lift amount thereof.

The circumferential edge groove 73 is disposed radially inside and close to the valve surface 55, so that the turbulent flow of air can be effectively supplied onto the valve surface 55. Further, as the circumferential edge groove 73 is capable of causing a weak turbulent flow, accordingly reduced is flow resistance itself applied to intake air in the circumferential edge groove 73. The width W2 of the circumferential edge groove 73 in plan view is substantially equal to or less than the width W1 of the valve surface 55 in plan view. Accordingly, reduction is also achieved in flow resistance itself applied to intake air in the circumferential edge groove 73.

As a result, the engine unit 5 is allowed to generate more dynamic power thereby to increase the output therefrom. Therefore, performance of the motorbike 1 is greatly improved.

Described below are comparisons in various perspectives between the inlet valve 43 according to the present preferred embodiment and the inlet valves according to comparative examples.

In the following, two types of inlet valves are selected as comparative examples with respect to the inlet valve 43 according to the present preferred embodiment. Comparatively described is intake of air into the combustion chamber A with use of each of the inlet valves according to these comparative examples.

Figure 6:
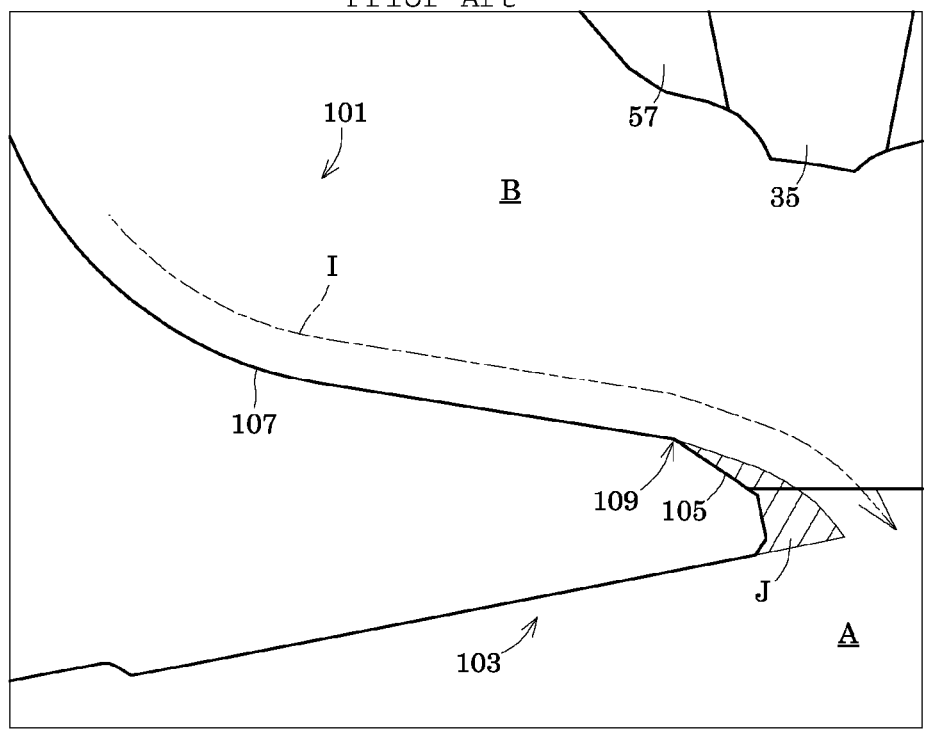
FIG. 6 is a pattern diagram showing movement of intake air along an inlet valve according to a comparative example.

First, refer to FIG. 6 showing a pattern diagram of a flow of air taken into the combustion chamber A with use of an inlet valve 101 according to one of the comparative examples. There is not provided in a valve head 103 of the inlet valve 101 shown in FIG. 6 a portion corresponding to the circumferential edge groove 73 according to the present preferred embodiment. A valve surface 105 is joined directly with a central surface 107 at a joint portion 109.

In the case with the inlet valve 101, an airflow I proceeds radially outward near the central surface 107 and reaches the joint portion 109 while remaining as a laminar flow. The airflow I thus departs from a surface of the valve head 103 at the joint portion 109 and proceeds along an extended line of the central surface 107 with almost no redirection thereof. In other words, the airflow I neither proceeds along the valve surface 105 nor surrounds a circumferential edge portion of the valve head 103. The valve head 103 therefore has an apparent diameter larger than an actual diameter thereof. FIG. 6 clearly indicates an apparently added region J in the valve head 103 relative to the actual valve head 103.

As described above, the flow path of intake air into the combustion chamber A through the inlet valve 101 (that is, the path of air flowing into the combustion chamber A) is limited to radially outward. The flow path of intake air into the combustion chamber A through the inlet valve 101 is thus narrower than that of the inlet valve 43 according to the present preferred embodiment. Accordingly, air is not efficiently taken into the combustion chamber A, resulting in a relatively small intake air volume.

Figure 7:
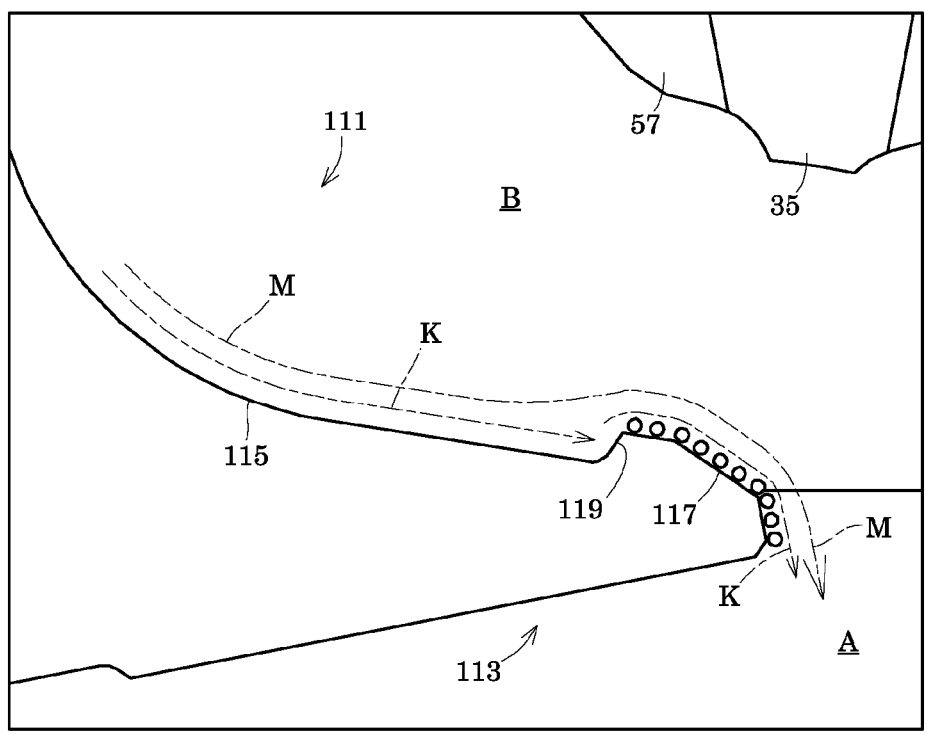
FIG. 7 is a pattern diagram showing movement of intake air along an inlet valve according to a comparative example.

Refer to FIG. 7 showing a pattern diagram of a flow of air taken into the combustion chamber A with use of an inlet valve 111 according to the other of the comparative examples. The inlet valve 111 shown in FIG. 7 includes a valve head 113 that is provided with a stepped portion. More specifically, a radially outer end of a central surface 115 is stepped downward from a valve surface 117 to define a barrier 119 between the central surface 115 and the valve surface 117.

In the case with the inlet valve 111, an airflow K proceeds radially outward near the central surface 115 and entirely hits the barrier 119. Such hitting causes the airflow K to form a turbulent flow. The turbulent airflow K proceeds along the valve surface 117. FIG. 7 shows the area of the turbulent flow as patterns with use of circles (o).

The airflow K is redirected from radially outward into downward such as to surround a circumferential edge portion of the valve head 113, and then enters the combustion chamber A. There is another airflow M that proceeds outside the path of the airflow K and enters the combustion chamber A. Therefore, the flow path of intake air into the combustion chamber A through the inlet valve 111 (that is, the path of air flowing into the combustion chamber A) is wide.

However, as the airflow K entirely hits the barrier 119, intake air receives relatively high resistance. On the other hand, in the case with the inlet valve 43 according to the present preferred embodiment described with reference to FIG. 5, flow resistance is applied only to the airflow G1 as part of the airflow G, so that resistance applied to intake air is relatively low.

Further, the path of the airflow M is also bent significantly by the barrier 119. In particular, the airflow M is remarkably redirected above the barrier 119, resulting in further increase in resistance applied to intake air. On the other hand, in the case with the inlet valve 43 according to the present preferred embodiment, the airflow H is hardly redirected above the circumferential edge groove 73, so that resistance applied to intake air is relatively low.

Therefore, in the case with the inlet valve 111, although the flow path of intake air into the combustion chamber A through the inlet valve 111 is wide, resistance applied to intake air is relatively high. Accordingly, intake efficiency of air into the combustion chamber A is less than that of the inlet valve 43 according to the present preferred embodiment. The intake air volume of the inlet valve 111 is thus smaller than that of the inlet valve 43. Moreover, as flow resistance applied to intake air of the inlet valve 111 is relatively higher than that of the inlet valve 43, the inlet valve 111 is unstable rather than the inlet valve 43 also in view of stability in intake efficiency, and is likely to be unbalanced. For example, the intake efficiency of the inlet valve 111 may be deteriorated due to the lift amount or the like.

Next, the inlet valves according to comparative examples are compared with the inlet valve 43 according to the present preferred embodiment in view of intake air volumes.

FIGS. 8A to 8D are views showing shapes of four types of inlet valves according to the comparative examples, respectively. FIG. 8A shows an inlet valve 121 of a standard type, FIG. 8B shows an inlet valve 131 of a type provided with a stepped portion, FIG. 8C shows an inlet valve 141 of a type provided with two grooves, and FIG. 8D shows an inlet valve 151 of a type provided with an inner circumferential groove. Hereinafter, these inlet valves are referred to as the standard type 121, the stepped type 131, the two-groove type 141, and the inner circumferential groove type 151, respectively, where appropriate.

The standard type 121 includes a valve head 123 that is not provided with a portion corresponding to the circumferential edge groove 73 of the present preferred embodiment. Accordingly, the valve head 123 has a central surface 125 and a valve surface 127 that are joined directly with each other.

The stepped type 131 includes a valve head 133 that is provided with a stepped part. More specifically, a radially outer end of a central surface 135 is stepped downward from a valve surface 137 to form a barrier 139 between the central surface 135 and the valve surface 137.

The two-groove type 141 includes a valve head 143 provided with two grooves 145 and 147. The groove 145 is formed in a circumferential edge portion of the valve head 143, and the groove 147 is formed radially inside the circumferential edge portion. Hereinafter, the groove 145 is referred to as the "circumferential edge groove 145" and the groove 147 is referred to as the "inner circumferential groove 147" where appropriate.

The inner circumferential groove type 151 is configured similarly to the above two-groove type 141 with no circumferential edge groove 145 being provided therein. In other words, the inner circumferential groove type 151 includes a valve head 153 provided only with an inner circumferential groove 157.

Measurements were conducted as follows with use of the respective inlet valves 43, 121, 131, 141, and 151 described above. More specifically, the combustion chamber A and the inlet port B are each set to have a predetermined pressure. Flow rates (L/sec) of air taken into the combustion chamber A from the inlet port B, which is kept opened, were actually measured respectively at valve lift amounts varied from 0 (mm) to 10 (mm). Table 1 indicates actual measurement results of the flow rates of intake air at the respective valve lift amounts. Clearly indicated by being circled in Table 1 are the maximum values of the flow rates at the respective valve lift amounts.

TABLE 1

| Valve lift amount [mm] | Standard type 121 [L/sec] | Stepped type 131 [L/sec] | Two-groove type 141 [L/sec] | Inner circumferential groove type 151 [L/sec] | Inlet valve 43 of the present embodiment [L/sec] |
|---|---|---|---|---|---|
| 0 | 0.000 | 0.000 | 0.000 | 0.000 | 0.000 |
| 1 | 10.200 | 10.000 | (10.500) | 10.200 | 10.400 |
| 2 | 21.300 | 21.600 | (22.100) | 20.500 | 22.000 |
| 3 | 30.700 | 34.600 | (34.900) | 31.000 | 34.600 |
| 4 | 41.500 | (46.600) | 46.000 | 41.700 | 46.100 |
| 5 | 51.600 | (56.500) | 55.400 | 51.800 | 55.600 |
| 6 | 59.700 | (62.900) | 62.300 | 60.000 | 62.700 |
| 7 | 65.300 | 67.300 | 67.500 | 65.700 | (67.700) |
| 8 | 67.600 | 69.000 | 69.300 | 68.800 | (69.500) |
| 9 | 69.200 | 69.800 | 70.700 | 70.100 | (71.000) |
| 10 | 70.300 | 70.000 | 71.600 | 71.200 | (71.700) |

As indicated in Table 1, all the valves similarly tend to have flow rates increased in proportion to increase in valve lift amount. The valves of the respective types are compared with each other in each of the valve lift amounts in a low range from about 1 mm to about 3 mm, a middle range from about 4 mm to about 6 mm, and a high range from about 7 mm to about 10 mm, for example. The two-groove type 141 has the largest flow rates at the valve lift amounts in the low range, the stepped type 131 has the largest flow rates at the valve lift amounts in the middle range, and the inlet valve 43 according to the present preferred embodiment has the largest flow rates at the valve lift amounts in the high range.

In order to clarify the tendencies of the respective valves, indicated in Table 2 are change ratios (%) of the flow rates of the respective valves relative to the flow rates of the standard type 121 set as references. Clearly indicated by being circled in Table 2 are the largest change ratios at the respective valve lift amounts.

TABLE 2

| Valve lift amount [mm] | Standard type 121 | Stepped type 131 | Two-groove type 141 | Inner circumferential groove type 151 | Inlet valve 43 of the present embodiment |
|---|---|---|---|---|---|
| 0 | 0.0% | 0.0% | 0.0% | 0.0% | 0.0% |
| 1 | 0.0% | -2.0% | 2.9% | 0.0% | 2.0% |
| 2 | 0.0% | 1.4% | 3.8% | -3.8% | 3.3% |
| 3 | 0.0% | 12.7% | 13.7% | 1.0% | 12.7% |
| 4 | 0.0% | 12.3% | 10.8% | 0.5% | 11.1% |
| 5 | 0.0% | 9.5% | 7.4% | 0.4% | 7.8% |
| 6 | 0.0% | 5.4% | 4.4% | 0.5% | 5.0% |
| 7 | 0.0% | 3.1% | 3.4% | 0.6% | 3.7% |
| 8 | 0.0% | 2.1% | 2.5% | 1.8% | 2.8% |
| 9 | 0.0% | 0.9% | 2.2% | 1.3% | 2.6% |
| 10 | 0.0% | -0.4% | 1.8% | 1.3% | 2.0% |

Figure 9:
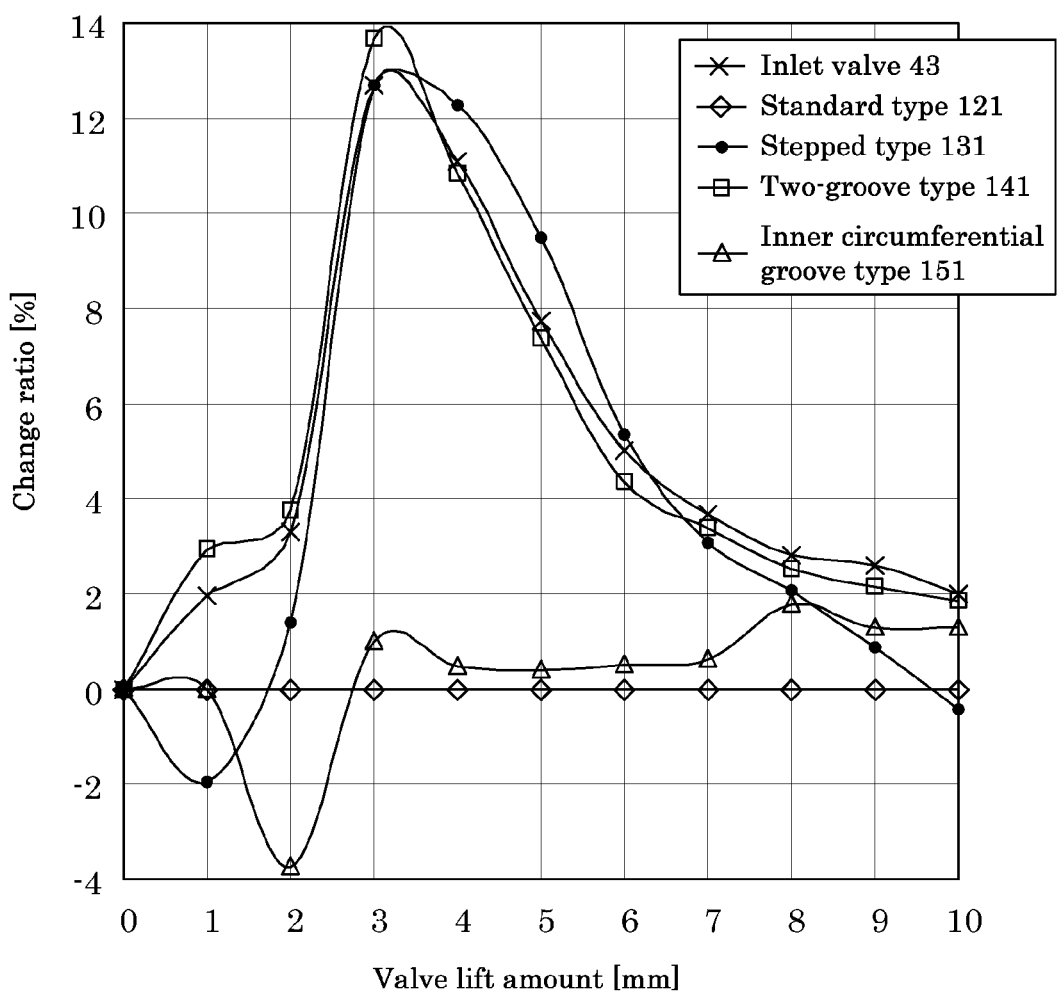
FIG. 9 is a graph indicating change ratios (%) of flow rates of the inlet valve according to a preferred embodiment of the present invention and the inlet valves according to the comparative examples, relative to the flow rate of the inlet valve of a standard type according to one of the comparative examples.

FIG. 9 is a graph indicating the change ratios (%) of the flow rates of the respective valves relative to the flow rates of the standard type 121. The graph in FIG. 9 has a horizontal axis indicative of the valve lift amounts (mm) and a vertical axis indicative of the change ratios (%).

The following features of the flow rates of the respective valves become clear from Table 2 and FIG. 9. Specifically, the inlet valve 43 according to the present preferred embodiment and the two-groove type 141 each have relatively large flow rates at the valve lift amounts in the low range and the high range. Further, at the valve lift amounts in the middle range, the inlet valve 43 according to the present preferred embodiment and the two-groove type 141 each have flow rates that are smaller than those of the stepped type 131 but much larger than those of the standard type 121 and the inner circumferential groove type 151.

The stepped type 131 exerts significantly a large flow rate at the valve lift amount of about 3 mm, while being drastically deteriorated at the valve lift amounts in the low range and the high range. In particular, among all the inlet valves, the stepped type 131 records the smallest flow rates at the valve lift amounts of about 1 mm and about 10 mm, for example.

The standard type 121 and the inner circumferential groove type 151 exert flow rates relatively small at the valve lift amounts in all the ranges.

Figure 10:
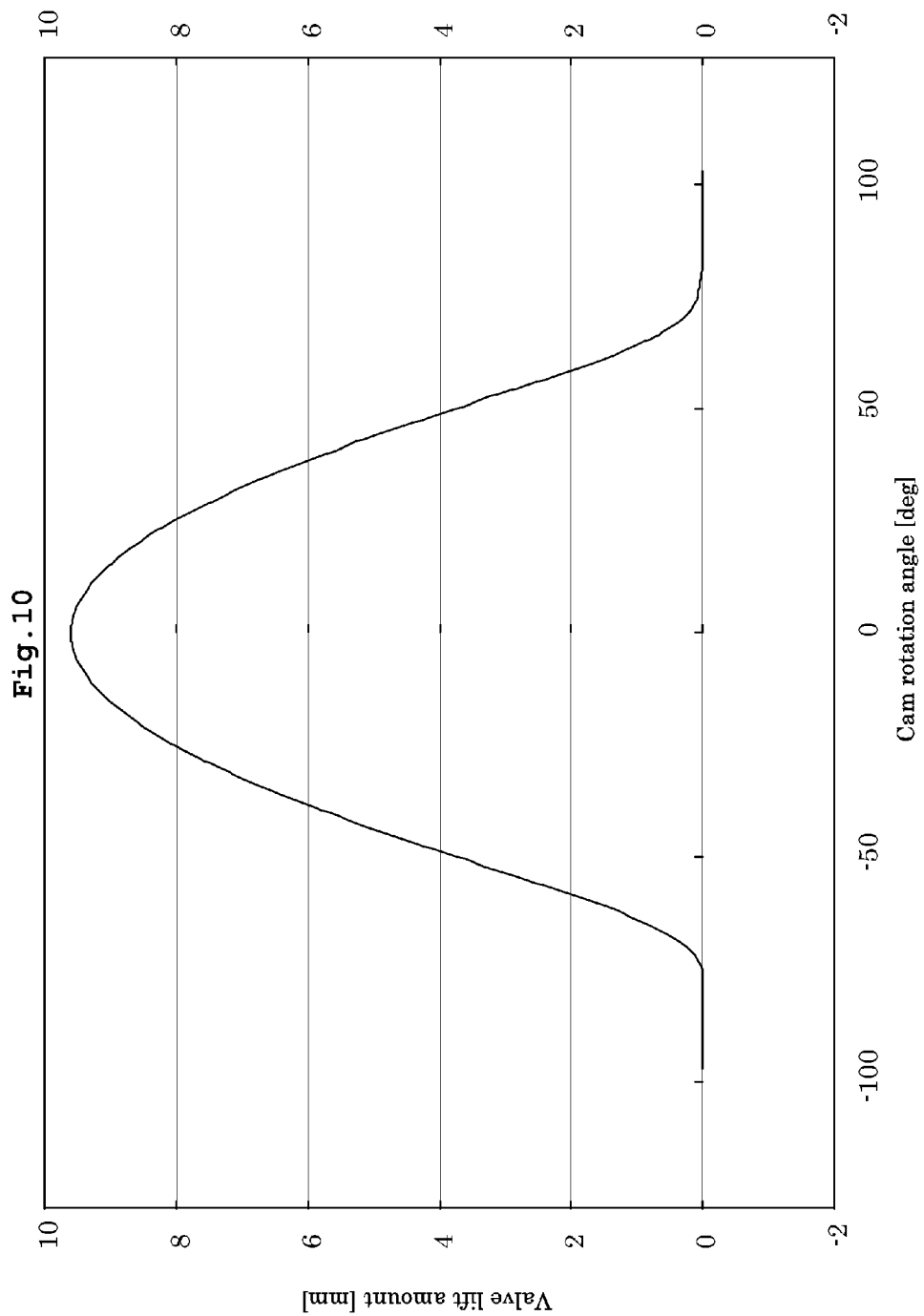
FIG. 10 is a graph indicating a relationship between cam rotation angles and valve lift amounts.

Table 3 indicates intake air volumes estimated based on the measurement results of Table 1. These estimations assume that each of the inlet valves is driven by the cam rotating at a rotation speed of about 2500 rpm as well as that cam rotation angles and the valve lift amounts of each of the inlet valves have the correlation indicated in FIG. 10. The maximum valve lift amount of 9.6 mm is estimated at a cam rotation angle of 0 degrees. Each of the values indicated in Table 3 is the intake air volume to be exerted in one intake stroke.

TABLE 3

| | Standard type 121 | Stepped type 131 | Two-groove type 141 | Inner circumferential groove type 151 | Inlet valve 43 of The present embodiment |
|---|---|---|---|---|---|
| Intake air volume [cc] | 474.460 | 490.238 | 493.223 | 478.750 | 494.427 |

As indicated in Table 3, the inlet valve 43 according to the present preferred embodiment has the largest intake air volume. The two-groove type 141 has an intake air volume slightly smaller than that of the inlet valve 43. In view of the above, the intake air volumes become smaller in the order of the stepped type 131, the inner circumferential groove type 151, and the standard type 121.

Regarding the inlet valve 43, the partial intake air volume at the valve lift amounts of at least about 9 mm occupies approximately 30% of the whole intake air volume. The partial intake air volume at the valve lift amounts of at least about 8 mm occupies approximately 50% of the whole intake air volume. The partial intake air volume at the valve lift amounts in the high range (at least about 7 mm) occupies approximately 63% of the whole intake air volume. As exemplified above, the whole intake air volume is largely dependent on the partial intake air volume at the valve lift amounts in the high range. That is, the whole intake air volume tends to be relatively large in a case where the flow rates are relatively large at the valve lift amounts in the high range. As described above, the inlet valve 43 according to the present preferred embodiment can actually cause air to be taken in at flow rates larger than those of the inlet valves of the respective types according to the comparative examples, at valve lift amounts in a relatively high range.

Next, comparisons are made among the standard type 121, the stepped type 131, the two-groove type 141, and the inlet valve 43 according to the present preferred embodiment, in view of strength (stress).

Calculated were stress values at the valve heads of the respective inlet valves under the following conditions.

The inlet valves are each assumed to be made of a titanium alloy (specifically, Ti-6Al-2Sn-4Zr-2Mo, for example) as well as to have a Young's modulus of about 117 GPa, a Poisson's ratio of about 0.315, and a density of about $4.43 \times 10^{-6}$ kg/mm$^3$, for example. In a state where the valve surface of each of the inlet valves is restrained from being shifted perpendicularly to the valve surface, a pressure of about 8 MPa is applied to the entire lower surface of the valve head and a force of about 149.5 N is applied to the upper end of the valve stem in the upper axial direction. Strength analysis simulation was performed under these conditions to estimate the stress values on the upper surface of each of the valve heads.

FIGS. 11A to 11D are pattern diagrams each indicating the stress values on the valve head of the corresponding inlet valve. FIGS. 11A to 11D each show a portion of the inlet valve (of approximately 20 degrees around the axis of the valve stem) cut apart therefrom, with locations of estimation on the valve head and the stress values at the locations being indicated therein. FIGS. 11A to 11D refer to the inlet valve 43 according to the present preferred embodiment, the two-groove type 141, the standard type 121, and the stepped type 131, respectively.

Figure 11A:
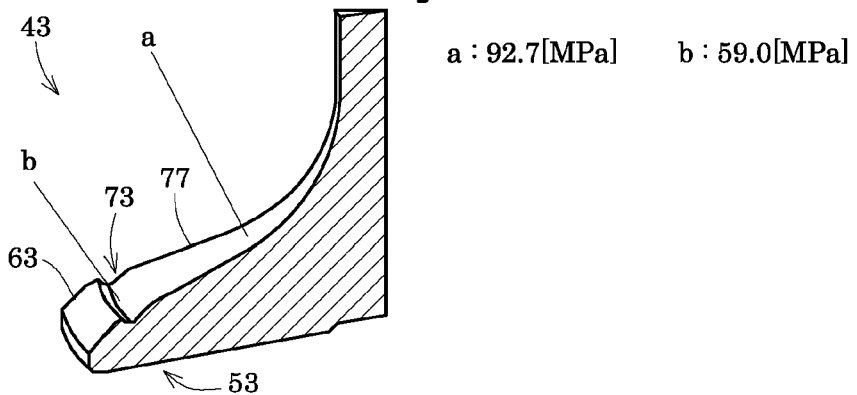
FIG. 11A is a cross sectional pattern diagram of a main portion of the inlet valve according to a preferred embodiment of the present invention with stress values indicated therewith.

As indicated in FIG. 11A, the inlet valve 43 has the maximum stress value of about 92.7 MPa at a point a on the central surface 77. This value is equal to the stress value at a point a of the standard type 121 (see FIG. 11C).

Figure 11B:
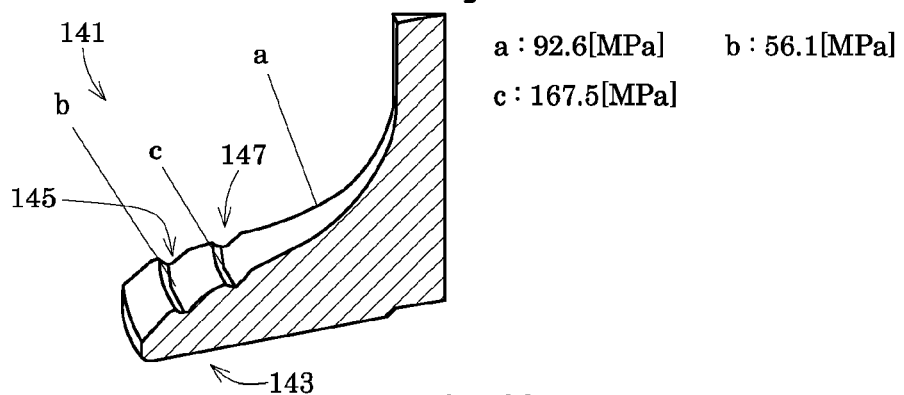
FIG. 11B is a cross sectional pattern diagram of a main portion of the inlet valve according to one of the comparative examples with stress values indicated therewith.

On the other hand, as indicated in FIG. 11B, the maximum stress value of the two-groove type 141 is about 167.5 MPa estimated at a point c on the inner circumferential groove 147. This value is extremely higher than the estimated stress values of the inlet valves of four types.

Figure 11C:
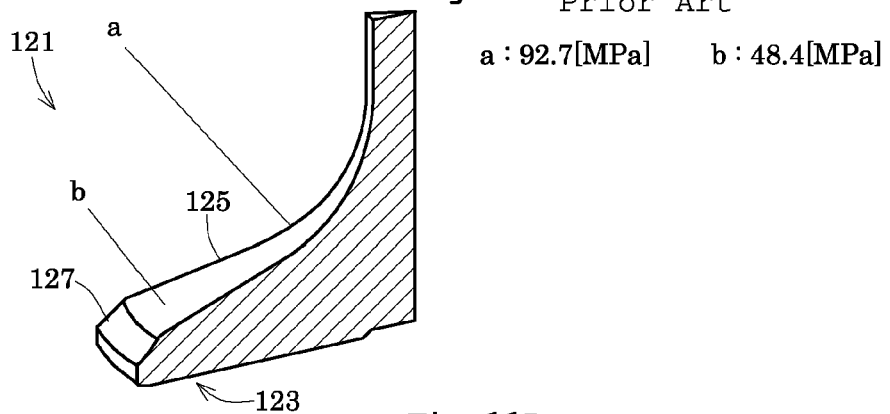
FIG. 11C is a cross sectional pattern diagram of a main portion of the inlet valve according to one of the comparative examples with stress values indicated therewith.

As indicated in FIG. 11C, the standard type 121 has the maximum stress value of about 92.7 MPa at a point a on the central surface 125. The stress value at a point b on the circumferential edge portion of the valve head 123 is the lowest among those of the other inlet valves.

Figure 11D:
FIG. 11D is a cross sectional pattern diagram of a main portion of the inlet valve according to one of the comparative examples with stress values indicated therewith.

As indicated in FIG. 11D, the maximum stress value of the stepped type 131 is about 117.2 MPa estimated at a point a on the central surface 135. This is because the thickness of the central surface 135 is slightly reduced in order to cause the central surface 135 to be stepped downward from the valve surface 137.

According to the above, the standard type 121 has the most excellent strength as the stress is not concentrated on the valve head 123. The maximum stress value of the inlet valve 43 is equal to that of the standard type 121, so that the inlet valve 43 is recognized as having strength substantially equal to that of the standard type 121. To the contrary, the two-groove type 141 has the stress slightly less than twice the maximum stress value of the inlet valve 43 concentrated on the inner circumferential groove 147. Strength of the two-groove type 141 is significantly lower than that of the inlet valve 43.

As described above, the inlet valve 43 according to the present preferred embodiment is recognized as having intake efficiency higher than those of the respective inlet valves according to the comparative examples in view of the flow (movement) of intake air. Further recognized is that the inlet valve 43 has the largest intake air volume from the actual measurement results on the flow rates of intake air. In consideration of the results of calculations on strength, the inlet valve 43 achieves an increase in intake air volume with no deterioration in strength (that is, with no concentration of stress). In contrast, although the two-groove type 141 is capable of increasing the intake air volume, strength thereof is remarkably deteriorated.

Described below are preferable ranges of the distance D between the valve surface 55 and the circumferential edge groove 73 in plan view as well as of the depth F of the circumferential edge groove 73.

As indicated in Table 4, there were prepared the inlet valves 43 according to examples of the present preferred embodiment, including ten types of different combinations of the distance D and the depth F. Hereinafter, these inlet valves 43 of ten types are referred to as inlet valves N1, N2, . . . , and N10.

TABLE 4

| Inlet valves 43 | Distance D [mm] | Depth F [mm] |
| --- | --- | --- |
| N1 | 0.5 | 0.4 |
| N2 | 0.5 | 0.9 |
| N3 | 0.5 | 1.4 |
| N4 | 0.5 | 1.9 |
| N5 | 0.3 | 0.6 |
| N6 | 0.7 | 0.2 |
| N7 | 0.3 | 1.6 |
| N8 | 0.7 | 1.2 |
| N9 | 0.9 | 1.0 |
| N10 | 0.7 | 0.7 |

Measurements were conducted similarly to the flow rate measurements described above with use of these ten types of inlet valves N1 to N10. Specifically, the combustion chamber A and the inlet port B are each set to have a predetermined pressure. The flow rates (L/sec) of air taken into the combustion chamber A from the inlet port B were actually measured respectively in states where the inlet port B was kept open at the respective valve lift amounts varying from 0 mm to about 10 mm, for example.

Table 5 indicates the actual measurement results of the flow rates of intake air at the respective valve lift amounts. Clearly indicated in Table 5 are the largest flow rate values each surrounded by triple circles, the second largest flow rate values each surrounded by double circles, and the third largest flow rate values each surrounded by single dashed circle, at the respective valve lift amounts.

TABLE 5

| Valve lift amount [mm] | Inlet valve | | | | | | | | | |
|---|---|---|---|---|---|---|---|---|---|---|
| | N1 [L/sec] | N2 [L/sec] | N3 [L/sec] | N4 [L/sec] | N5 [L/sec] | N6 [L/sec] | N7 [L/sec] | N8 [L/sec] | N9 [L/sec] | N10 [L/sec] |
| 0 | 0.000 | 0.000 | 0.000 | 0.000 | 0.000 | 0.000 | 0.000 | 0.000 | 0.000 | 0.000 |
| 1 | 10.000 | 10.400 | 9.900 | 9.800 | 9.700 | 9.700 | 10.000 | 9.700 | 9.600 | 10.000 |
| 2 | 21.000 | 22.000 | 20.700 | 20.800 | 21.000 | 20.900 | 20.600 | 21.400 | 21.400 | 21.800 |
| 3 | 31.700 | 34.600 | 31.000 | 30.900 | 31.200 | 31.900 | 30.600 | 33.800 | 33.900 | 34.100 |
| 4 | 43.300 | 46.100 | 43.000 | 42.300 | 42.000 | 43.000 | 41.400 | 44.800 | 45.000 | 45.400 |
| 5 | 53.900 | 55.600 | 53.200 | 52.800 | 52.700 | 53.400 | 51.500 | 54.700 | 54.600 | 55.000 |
| 6 | 61.400 | 62.700 | 61.200 | 60.700 | 61.200 | 61.100 | 59.300 | 61.800 | 61.700 | 62.000 |
| 7 | 67.000 | 67.700 | 66.500 | 66.400 | 66.600 | 66.000 | 64.800 | 67.000 | 56.700 | 67.200 |
| 8 | 69.000 | 69.500 | 68.800 | 68.600 | 68.700 | 68.200 | 67.000 | 69.000 | 68.700 | 69.100 |
| 9 | 70.600 | 71.000 | 70.200 | 70.200 | 70.300 | 70.000 | 68.900 | 70.400 | 70.200 | 70.500 |
| 10 | 71.600 | 71.700 | 71.100 | 71.200 | 71.100 | 71.100 | 70.000 | 71.400 | 71.200 | 71.400 |

As indicated in Table 5, the inlet valve N2 has the largest flow rates at all the valve lift amounts. The second preferred results are obtained with the inlet valve N10, which has large flow rates at all the valve lift amounts. The inlet valve N2 is configured to have a distance D of about 0.5 mm and a depth F of the circumferential edge groove 73 of about 1.1 mm, for example. The inlet valve N10 is configured to have a distance D of about 0.7 mm and a depth F of the circumferential edge groove 73 of about 0.7 mm, for example.

Table 6 indicates intake air volumes estimated from the measurement results of Table 5. These estimations assume that the cam for driving each of the inlet valves rotates at a rotation speed of about 2500 rpm as well as that cam rotation angles and the valve lift amounts of each of the inlet valves have the correlation indicated in FIG. 10. The maximum valve lift amount is about 9.6 mm is estimated at the cam rotation angle of 0 degrees. Table 6 indicates the intake air volumes obtained in one intake stroke. Also indicated in Table 6 are rank orders (1) to (10) from the largest intake air volume.

TABLE 6

| | N1 | N2 | N3 | N4 | N5 | N6 | N7 | N8 | N9 | N10 |
|---|---|---|---|---|---|---|---|---|---|---|
| Intake air volume [cc] | 485.525 | 494.427 | 481.890 | 480.685 | 481.422 | 481.201 | 471.365 | 488.111 | 486.920 | 490.095 |
| (Rank order) | (5) | (1) | (6) | (9) | (7) | (8) | (10) | (3) | (4) | (2) |

As indicated in Table 6, the inlet valve N2 has the largest intake air volume, and the inlet valve N10 has the second largest intake air volume.

FIG. 12 is a pattern diagram indicating the relationship between the intake air volumes and the specifications (combinations of the distance D and the depth F of the circumferential edge groove 73) of the inlet valves 43. FIG. 12 is a graph having a horizontal axis indicative of the depths F (mm) of the circumferential edge grooves 73 and a vertical axis indicative of the distances D (mm). Points are plotted at locations indicating the combinations of the distance D and the depth F of the circumferential edge groove 73 in the respective inlet valves N1 to N10, with the intake air volumes (cc) and the rank orders of the intake air volumes in brackets being added beside the points. This pattern diagram also shows a combination area Q1 of intake air volumes exceeding about 490 cc, a combination area Q2 of intake air volumes of at least about 485 cc and less than about 490 cc, and a combination are Q3 of intake air volumes of less than about 485 cc, for example.

With reference to FIG. 12, the following description is in view of the intake air volumes. As apparent from FIG. 12, the following is generally applicable to the depth F of the circumferential edge groove 73. Specifically, the depth F of the circumferential edge groove 73 is more preferably at least about 0.5 mm rather than at most about 0.3 mm (such as those of the inlet valves N5 and N7). Moreover, in a range of at least about 0.5 mm, the depth F of the circumferential edge groove 73 is more preferably at most about 0.7 mm rather than at least about 0.9 mm, for example.

The following is generally applicable to the distance D. Specifically, the distance D is more preferably at least about 0.4 mm and at most about 1.4 mm rather than at most about 0.2 mm or at least about 1.6 mm, for example. Moreover, in a range from about 0.4 mm to about 1.4 mm, the distance D is more preferably at least about 0.5 mm and at most about 1.2 mm, for example. Furthermore, in a range from about 0.5 mm to about 1.2 mm, the distance D is more preferably at least about 0.5 mm and at most about 1.1 mm, for example.

Focusing on the inlet valves N1, N2, N3, and N9, in a case where the depth F of the circumferential edge groove 73 is about 0.5 mm, the distance D is preferably more than about 0.4 mm and less than about 1.4 mm rather than at most about 0.4 mm or at least about 1.4 mm, for example. The distance D is more preferably about 0.9 mm or a value close thereto, for example. On the other hand, focusing on the inlet valves N6, N10, and N8, in a case where the depth F of the circumferential edge groove 73 is about 0.7 mm, the distance D is preferably more than about 0.2 mm and less than about 1.2 mm rather than at most about 0.2 mm or at least about 1.2 mm, for example. The distance D is more preferably about 0.7 mm or a value close thereto, for example.

Focusing on the inlet valves N5, N2, N1, N8, N10, and N9, in a case where the distance D is in a range from about 0.4 mm to about 1.2 mm, the depth F of the circumferential edge groove 73 is preferably at least about 0.5 mm rather than at most about 0.3 mm, for example. In this case, the depth F of the circumferential edge groove 73 is more preferably at most about 0.7 mm, for example.

If the distance D has a significantly large value, such an inlet valve is categorized not as the inlet valve 43 having the groove formed in the circumferential edge portion 71 but as the inner circumferential groove type 151 described above. In such a case, the intake air volume is significantly reduced, as described above.

The present invention is not limited to the above preferred embodiments, but may be modified and embodied as follows.

According to the above preferred embodiments, the outer joint portion C2 is preferably located on the extended line L of the central surface 77. However, the present invention is not limited thereto. Alternatively, the outer joint portion C2 maybe configured to be located below the extended line L of the central surface 77.

According to the above preferred embodiments, the circumferential edge surface 75 is preferably located on the extended line L of the central surface 77. However, the present invention is not limited thereto. Alternatively, the circumferential edge surface 75 may be configured to be located below the extended line L of the central surface 77.

According to the above preferred embodiments, the inner joint portion C1 and the outer joint portion C2 each preferably have the sharp edge. However, the present invention is not limited thereto. Alternatively, the inner joint portion C1 and/or the outer joint portion C2 may be chamfered.

In the above preferred embodiments, the central surface 77 may preferably be curved or linear in sectional view. Similarly, the circumferential edge surface 75 may be curved or linear in sectional view.

The above preferred embodiments specifically exemplify the preferable ranges of the distance D, the depth F of the circumferential edge groove 73, the angles θ1 to θ4, the radii of curvature at the inner joint portion C1 and the outer joint portion C2, and the diameter of the valve head 53. However, the present invention is not limited thereto. These dimensions and specifications may be appropriately selected and designed in accordance with the specifications or purposes of the engine unit 5.

According to the above preferred embodiments, the fuel injection unit 49 is preferably provided to the inlet pipe 11. However, the present invention is not limited thereto. The above configuration may be modified by replacing the fuel injection unit 49 with a carburetor unit. Alternatively, the fuel injection unit 49 may be replaced by a direct injection nozzle for spraying a fuel directly into the combustion chamber A. In this case, air alone is supplied from the inlet pipe 11 to the inlet port B and is then taken into the combustion chamber A from the inlet port B.

The above preferred embodiments preferably use a titanium alloy or pure titanium as the material for the inlet valve. However, the present invention is not limited thereto. The material may be appropriately selected, such as a stainless steel or a heat resistant steel.

The above preferred embodiments preferably relate to a two-wheeled motor vehicle as a transportation apparatus. However, the present invention is not limited thereto. The transportation apparatus may be a three-wheeled motor vehicle, a four-wheeled motor vehicle, or the like. Further, the purpose of use of the vehicle may be construction and civil engineering, agriculture, or other specifics. The transportation apparatus of the present invention is not limited to those on land but may be those at sea such as a marine vessel and a boat. Furthermore, the transportation apparatus of the present invention may be an air carrier such as a helicopter or an airplane.

Appropriate modifications may be applied to the present preferred embodiments or each of the modified preferred embodiments described above, by replacing or combining the configuration thereof with that of one of the other preferred embodiments.

The present invention may be embodied in other specific forms without departing from the spirit or essential attributes thereof and, accordingly, reference should be made to the appended claims, rather than to the foregoing specification, as indicating the scope of the present invention.

What is claimed is:

1. An inlet valve provided in an inlet port in communication with a combustion chamber, the inlet valve comprising:
    a valve head including:
        a valve surface within a circumferential edge portion of the valve head; and
        a single annular circumferential edge groove disposed in the circumferential edge portion of the valve head and radially inside the valve surface; and
    a valve stem including a first end coupled with a tip of the valve head and a second end extending upward.

2. The inlet valve according to claim 1, wherein the valve surface and the circumferential edge groove are spaced apart from each other in plan view by a distance of at least about 0.5 mm and at most about 1.1 mm.

3. The inlet valve according to claim 1, wherein the circumferential edge groove has a width in plan view substantially equal to or less than a width of the valve surface.

4. The inlet valve according to claim 1, wherein the valve head further includes a central surface smoothly inclined radially outward and downward from the tip to the circumferential edge groove, and the circumferential edge groove is concave downward from the central surface.

5. The inlet valve according to claim 4, wherein the circumferential edge groove has a depth of at least about 0.5 mm and at most about 0.7 mm.

6. The inlet valve according to claim 4, wherein the circumferential edge groove has a cross-section in a substantially V-letter shape.

7. The inlet valve according to claim 4, wherein the circumferential edge portion of the valve head does not protrude upward from an extended line of the central surface.

8. The inlet valve according to claim 4, wherein the circumferential edge groove includes an inner interior wall joined with the central surface, and the inner interior wall is inclined radially outward and downward from the central surface at an angle of at least about 15 degrees and at most about 30 degrees.

9. The inlet valve according to claim 8, wherein the inner interior wall is joined with the central surface at an inner joint portion having a radius of curvature of at most about 0.3 mm.

10. The inlet valve according to claim 8, wherein the valve head includes an annular circumferential edge surface between the circumferential edge groove and the valve surface, the circumferential edge groove includes an outer interior wall joined with the circumferential edge surface, and the outer interior wall is inclined radially inward and downward from the circumferential edge surface at an angle of at least about 60 degrees and at most about 75 degrees.

11. The inlet valve according to claim 10, wherein the outer interior wall is joined with the circumferential edge surface at an outer joint portion having a radius of curvature of at most about 0.3 mm.

12. The inlet valve according to claim 10, wherein the outer joint portion is located on an extended line of the central surface.

13. The inlet valve according to claim 1, wherein the valve head is made of titanium or a titanium alloy.

14. The inlet valve according to claim 1, wherein the valve surface is arranged to come into contact with a valve seat.

15. An engine unit comprising:
   an inlet valve provided in an inlet port in communication with a combustion chamber;
   a cylinder head provided with the inlet port;
   a cylinder block coupled with a bottom of the cylinder head; and
   a piston arranged in the cylinder block so as to be reciprocable therein, and defining the combustion chamber, which is in communication with the inlet port, together with the cylinder head and the cylinder block; wherein
   the inlet valve includes a valve head and a valve stem including a first end coupled with a tip of the valve head and a second end extending upward; and
   the valve head includes a valve surface within a circumferential edge portion of the valve head, and a single annular circumferential edge groove disposed in the circumferential edge portion and radially inside the valve surface.

16. A transportation apparatus comprising an engine unit that includes:
   an inlet valve provided in an inlet port in communication with a combustion chamber;
   a cylinder head provided with the inlet port;
   a cylinder block coupled with a bottom of the cylinder head; and
   a piston arranged in the cylinder block so as to be reciprocable therein, and defining the combustion chamber, which is in communication with the inlet port, together with the cylinder head and the cylinder block; wherein
   the inlet valve includes a valve head and a valve stem including a first end coupled with a tip of the valve head and a second end extending upward; and
   the valve head includes a valve surface within a circumferential edge portion of the valve head, and a single annular circumferential edge groove disposed in the circumferential edge portion and radially inside the valve surface.

* * * * *